US012541092B2

(12) United States Patent
Wheelwright et al.

(10) Patent No.: US 12,541,092 B2
(45) Date of Patent: Feb. 3, 2026

(54) NONLINEAR CONSECUTIVE SCANNING PROJECTOR

(71) Applicant: Meta Platforms Technologies, LLC, Menlo Park, CA (US)

(72) Inventors: Brian Wheelwright, Sammamish, WA (US); Daniel Guenther Greif, Redmond, WA (US); Jacques Gollier, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 902 days.

(21) Appl. No.: 17/825,661

(22) Filed: May 26, 2022

(65) Prior Publication Data

US 2023/0258923 A1 Aug. 17, 2023

Related U.S. Application Data

(60) Provisional application No. 63/310,488, filed on Feb. 15, 2022.

(51) Int. Cl.
*G02B 26/10* (2006.01)
*G02B 26/08* (2006.01)
(52) U.S. Cl.
CPC ....... *G02B 26/101* (2013.01); *G02B 26/0816* (2013.01)
(58) Field of Classification Search
CPC .................... G02B 26/101; G02B 26/0816
See application file for complete search history.

(56) References Cited

U.S. PATENT DOCUMENTS

2008/0218835 A1* 9/2008 Sandner ............. H04N 1/40037
348/E9.026
2020/0314395 A1* 10/2020 Greif .................. G02B 26/0841

OTHER PUBLICATIONS

International Search Report and Written Opinion for International Application No. PCT/US2023/013084, mailed May 25, 2023, 9 pages.
Petrak O., et al., "Laser Beam Scanning Based AR-Display Applying Resonant 2D MEMS Mirrors," Optical Architectures for Displays and Sensing in Augmented, Virtual, and Mixed Reality, Mar. 28, 2021, vol. 11765, 18 pages.
International Preliminary Report on Patentability for International Application No. PCT/US2023/013084, mailed Aug. 29, 2024, 8 pages.

* cited by examiner

*Primary Examiner* — Yassin Alata
(74) *Attorney, Agent, or Firm* — Greenberg Traurig, LLP

(57) ABSTRACT

A scanning projector is disclosed, including a light engine for providing a light beam, a beam scanner for scanning the light beam about two axes, and a controller operably coupled to the light engine and the beam scanner and configured to cause the beam scanner to non-linearly scan the light beam about the first and second axes within the field of view while varying brightness of the light beam to provide the image. The nonlinear scanning is performed such that consecutive scans provide conterminous portions of the image. This enables one to increase a local rate of providing the image across at least 75% of an area of the field of view is greater than 1500 degrees per second. The high local rate results in a significant reduction of artifacts caused by motion of displayed object, the users eyes or head, etc.

18 Claims, 18 Drawing Sheets

D) Smooth Pursuit

| Content | 30°/sec |
| --- | --- |
| Head | Stationary |
| Eyes | 30°/sec |

(A)
 (E)
 (B)
 (F)
 (C)
 (G)
 (D)
 (H)

NONLINEAR CONSECUTIVE SCANNING PROJECTOR

REFERENCE TO RELATED APPLICATION

The present application claims priority from U.S. Provisional Patent Application No. 63/310,488 filed on Feb. 15, 2022, entitled "Nonlinear Consecutive Scanning Projector" and incorporated herein by reference in its entirety.

TECHNICAL FIELD

The present disclosure relates to visual display devices, and in particular to scanning projectors and related methods.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems, such s near-eye displays or NEDs, are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Head-mounted display devices require compact and efficient components and modules such as light sources, image projectors, beam scanners, etc., that would have low image artifacts.

BRIEF DESCRIPTION OF THE DRAWINGS

Exemplary embodiments will now be described in conjunction with the drawings, in which.

DETAILED DESCRIPTION

Figure 1:
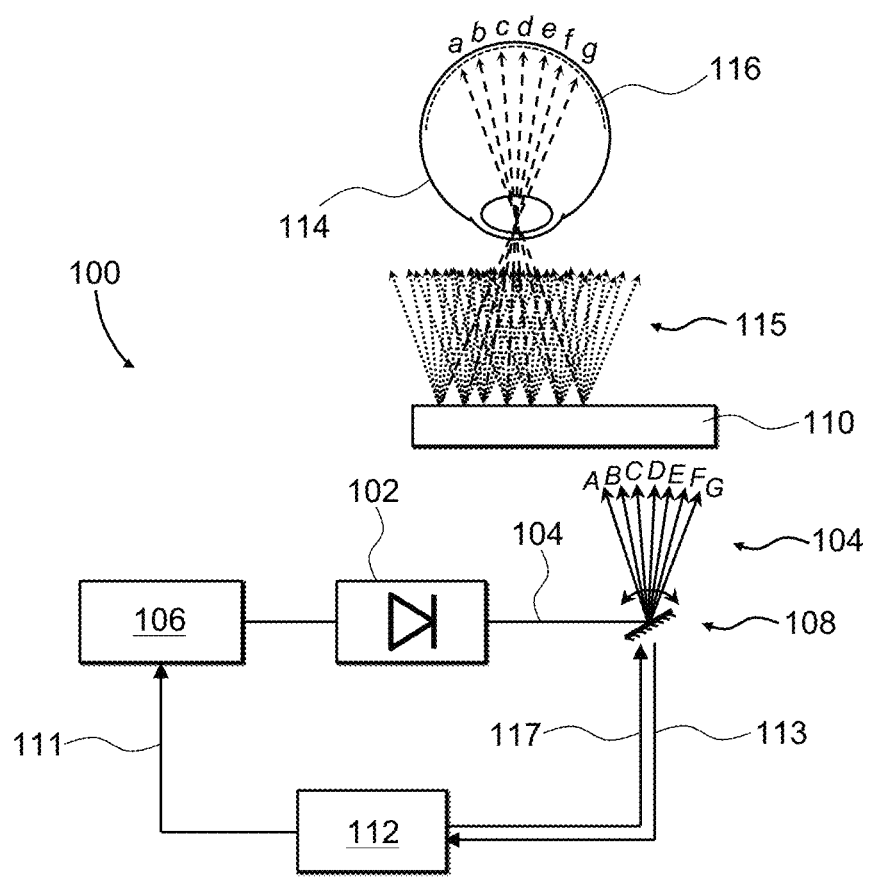
FIG. 1 is a schematic view of a near-eye display based on a scanning image projector.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A projector display may use an X- and Y-tiltable reflector, or a pair of unidirectionally tiltable reflectors, to scan an image-forming light beam across the display's field of view (FOV). Running the tiltable reflector(s) near mechanical oscillation resonance(s) provides fast scanning rates with minimal energy consumption in comparison with raster-type scanning. Since a fast scanner consumes a considerable amount of energy, the (bi)resonant scanning is highly desirable as it enables considerable power savings.

A resonant or nearly-resonant scanning, however, results in nonlinear scanning trajectories due to nearly-sinusoidal X- and Y-tilt angle variation of the tiltable reflector. These nonlinear trajectories may be approximated by Lissajous figures. While an entire image may be obtained by letting the Lissajous figures to eventually cover the entire field of view of the display, artifacts may appear when a displayed image and/or the viewer's eyes are moving. The Lissajous biresonant scanning can lead to splitting, shearing, banding, deformation, and even a complete breakdown of moving objects in the image beyond any recognition of the moving objects. Furthermore, the perceived imagery may be distorted, deformed, and/or appear structured even when the imagery remains still, and it is the viewer's eyes that are moving across the displayed imagery, following a displayed moving object, or performing a saccade-type movement, which can be distracting and unpleasant to the viewer.

In accordance with this disclosure, a nonlinear scanning such as biresonant Lissajous scanning may be configured to produce more uniform and free of motion distortion images by imposing certain restrictions on the character of nonlinear scanning in X- and Y-directions. For example, when nonlinear scanning is performed consecutively, i.e. when each consecutive scan produces a conterminous line or portion of the image, the distortion effects are greatly reduced, approaching those of a linear raster-type scanning. A local angular rate of providing consecutive portions of the image may be made approximately constant across the field of view. A local angular rate of providing consecutive portions of the image may be made approximately constant across local patches of the field of the field of view. Unidirectional scanning, i.e. energizing the light source only when the Lissajous scanning is performed in one direction, i.e. from one side or corner to the opposite side or corner, may also facilitate the reduction of undesired image splitting/deforming, or other undesired dynamic effects.

In accordance with the present disclosure, there is provided a scanning projector for providing an image having a field of view. The scanning projector comprises a light engine for providing a light beam, a beam scanner coupled to the light engine for scanning the light beam about first and second non-parallel axes, and a controller operably coupled to the light engine and the beam scanner. The controller is configured to cause the beam scanner to non-linearly scan the light beam about the first and second axes within the field of view while varying brightness of the light beam to provide the image such that consecutive scans provide conterminous portions of the image.

In some embodiments, the scanning is absent a raster-type scanning e.g. a linear scanning or a triangular scanning. A local rate of providing the image across at least 75% of an area of the field of view may be greater than 1500 degrees per second. In operation, the image may be provided at a repetition rate R. A frequency $F_1$ of scanning about the first axis and a frequency $F_2$ of scanning about the second axis may satisfy the condition $F_1=N_1*R$, $F_2=N_2*R$, wherein $N_1$ and $N_2$ are coprime numbers. A ratio of frequency P of providing a pixel of the image to a frequency $F_1$ of scanning about the first axis or a frequency $F_2$ of scanning about the second axis may be a rational number.

In embodiments where the beam scanner is a biresonant beam scanner with substantially sinusoidal scanning of the light beam about the first and second axes at corresponding resonant frequencies of the beam scanner, a ratio of the resonant frequencies of scanning about the first and second axes may be equal to e.g. 1, 2, or 3 to within 0.05. In embodiments where the controller is configured to provide the image during consecutive scans about the first axis in a same direction, the controller may be configured to provide the image during consecutive scans about the second axis in a same direction.

In embodiments where the light beam provided by the light engine comprises an array of sub-beams, the controller may be configured to vary a brightness of each sub-beam in coordination with the scanning to provide conterminous sub-portions of the conterminous portions of the image provided by the consecutive scans. The beam scanner may be a biresonant beam scanner with substantially sinusoidal scanning of the light beam about the first and second axes at corresponding resonant frequencies of the beam scanner. The array of sub-beams may have an array width in a direction of the array, and each subsequent scan about the second axis may be performed at a shift about the first axis substantially equal to the array width.

In accordance with the present disclosure, there is provided a scanning projector for providing an image having a field of view. The scanning projector comprises a light engine for providing a light beam, a beam scanner coupled to the light engine for scanning the light beam about first and second non-parallel axes, and a controller operably coupled to the light engine and the beam scanner. The controller may be configured to cause the beam scanner to non-linearly scan the light beam about the first and second axes within the field of view, and cause the light engine to provide the light beam having brightness varying in coordination with scanning by the beam scanner, thereby providing the image, wherein a local angular rate of providing conterminous lines of the image is varies by less than 90% across at least 75% of the field of view.

In some embodiments, the local angular rate varies by no more than 10% across at least 75% of 3 degrees by 3 degrees portions of the field of view. The scanning may be absent a raster-type scanning comprising a linear scanning or a triangular scanning. In operation, the image may be provided at a repetition rate R. A frequency $F_1$ of scanning about the first axis and a frequency $F_2$ of scanning about the second axis may satisfy the condition $F_1=N_1*R$, $F_2=N_2*R$, wherein $N_1$ and $N_2$ are coprime numbers. A ratio of frequency P of providing a pixel of the image to a frequency $F_1$ of scanning about the first axis or a frequency $F_2$ of scanning about the second axis may be a rational number.

In embodiments where the beam scanner is a biresonant beam scanner with substantially sinusoidal scanning of the light beam about the first and second axes at corresponding resonant frequencies of the beam scanner, a ratio of the resonant frequencies of scanning about the first and second axes may be equal to e.g. 1, 2, or 3 to within 0.05. The controller may be configured to provide the image during consecutive scans about the first axis in a same direction.

In accordance with the present disclosure, there is further provided a method for providing an image in angular domain. The method comprises using a light engine to provide a light beam, and using a biresonant beam scanner to sinusoidally scan the light beam about first and second non-parallel axes without interlacing, while varying brightness of the light beam in coordination with the scanning.

In some embodiments, a local rate of providing the image across at least 75% of an area of the image is greater than 1500 degrees per second. In some embodiments, consecutive sinusoidal scans of the light beam about the first axis are performed in a same direction.

Referring now to FIG. 1, a display device 100 includes a light source 102, e.g. a light-emitting diode or a laser diode, or another suitable semiconductor light source. The light source 102 provides a light beam 104. An electronic driver 106 is operably coupled to the light source 102 for powering the light source 102, e.g. by providing a sequence of powering electric pulses. A beam scanner 108 including a tiltable reflector, e.g. a microelectromechanical (MEMS) tiltable reflector described further below, is optically coupled to the light source 102 for scanning the light beam 104 generated by the light source 102. The scanning may be performed in one or two dimensions, e.g. about an X-axis and/or Y-axis perpendicular to the X-axes, where X- and Y-axes are in plane of the MEMS reflector at its normal i.e. unpowered position. A pupil replicator 110, e.g. a pupil-replicating lightguide, provides a light field 115 including multiple laterally shifted parallel portions of the scanned light beam 104. The multiple beam portions have a same beam angle as a direction of propagation of the light beam 104, at every moment of time as the light beam 104 is scanned about one or two axes, as the case may be.

A controller 112 is operably coupled to the beam scanner 108 and the electronic driver 106 of the light source 102. The controller 112 is configured for operating the electronic driver 106 to power the light source 102 in coordination with driving the beam scanner 108. For example, the controller 112 may apply a control signal 113 to cause the beam scanner 108 to scan the light beam 104 through a succession of beam angles or directions "A" through "G", while applying a power signal 111 to cause the electronic driver 106 to change the brightness of the light source 102 in accordance with an image to be displayed, thus forming an image in angular domain for direct observation by a viewer's eye 114. Herein, the term "image in angular domain" means an image where different pixels of the displayed image are represented by angles of corresponding rays of image light, the rays carrying optical power levels and/or color composition corresponding to brightness and/or color values of the image pixels. A feedback circuit may provide a feedback signal 117 to indicate the current MEMS mirror position to the controller 112.

The pupil replicator 110 provides multiple laterally displaced or laterally offset parallel portions or sub-beams of the scanned light beam 104 propagating in directions "A" through "G", as illustrated. The viewer's eye 114 receives the light field 115, and forms an image at the eye's retina 116 from the corresponding replicated sub-beams, as shown in FIG. 1. A linear position of the beam portions on the eye's retina 116 is denoted with letters "a" through "g", and corresponds to the beam angles or directions "A" through "G" of the scanned light beam 104. In this manner, the eye 114 forms an image in linear domain on the eye's retina 116 from the image in the angular domain formed by the light field 115. Note that in FIG. 1, the beam scanner 108 and the eye are on opposite sides of the pupil replicator 110. In some embodiments, a projector system may illuminate the pupil replicator 110 from the eye-side. It is to be noted that the principles described herein also apply to non-lightguide combiners. For example, the principles of this disclosure may apply to elliptical or holographic combiners.

Figure 2:
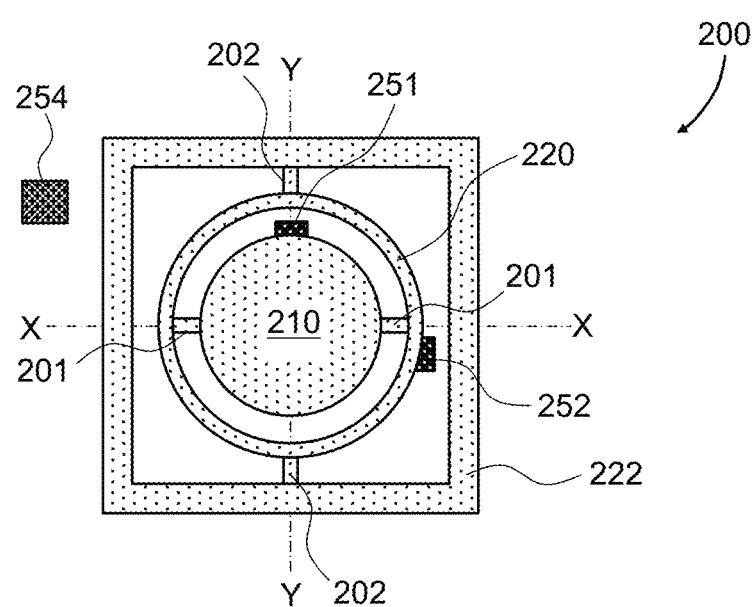
FIG. 2 is a plan view of a 2D tiltable microelectromechanical system (MEMS) reflector.

Referring to FIG. 2, a two-dimensional (2D) microelectromechanical system (MEMS) scanner 200 includes a reflector 210, e.g. a mirror, a diffraction grating, a nanostructure, etc., supported by a pair of first torsional hinges 201 allowing tilting the reflector 210 about X axis. The first torsional hinges 201 extend from the reflector 210 to a gimbal ring 220, which is supported by a pair of second torsional hinges 202 extending from the gimbal ring 220 to a fixed base 222, for tilting of the gimbal ring 220 and the reflector 210 about Y axis. The order of flexures in the X and Y axes may be the opposite of what is shown in FIG. 2. In some embodiments, the MEMS may have "gimbal-less" flexures which are not strictly decomposed into the X and Y axes.

Actuators may be disposed underneath the reflector 210 and/or the gimbal ring 220 for providing a force for actuating the tilt of the reflector 210 about X and Y axes. The actuators may be electrostatic, electro-magnetic, piezo-electric, etc. For electrostatic mirror actuation, the comb drive may be located on the torsional hinge members. For example, in the embodiment shown in FIG. 2, a first actuator 251 may be disposed under an edge of the reflector 210 to tilt the reflector 210 about X-axis. A second actuator 252 may be disposed under the gimbal ring 220 for tilting the gimbal ring 220 and the reflector 210 about Y-axis. The first 251 and second 252 actuators operate against the spring force of the first 201 and second 202 torsional hinges, respectively. From the mechanical viewpoint, the 2D MEMS scanner 200 is a biresonant mechanical oscillator. Operating the biresonant mechanical oscillator near its mechanical resonances provides considerable power savings, as noted above. It is noted that reflector 210 may be offset from a center of a corresponding substrate if needed.

A feedback circuit 254 may be provided for determining the X- and Y-angles of tilt of the reflector 210. The feedback circuit 254 may measure electric capacitance between the first electrostatic actuator 251 and the reflector 210 to determine the X-tilt, and electric capacitance between the second electrostatic actuator 252 and the gimbal ring 220 to determine the Y-tilt. Separate electrodes may also be provided specifically for the feedback circuit 254. In some embodiments, the feedback circuit 254 may provide a sync or triggering pulses when the reflector 210 is tilted at a certain X- and/or Y-angle, including a zero angle, for example.

Figure 3:
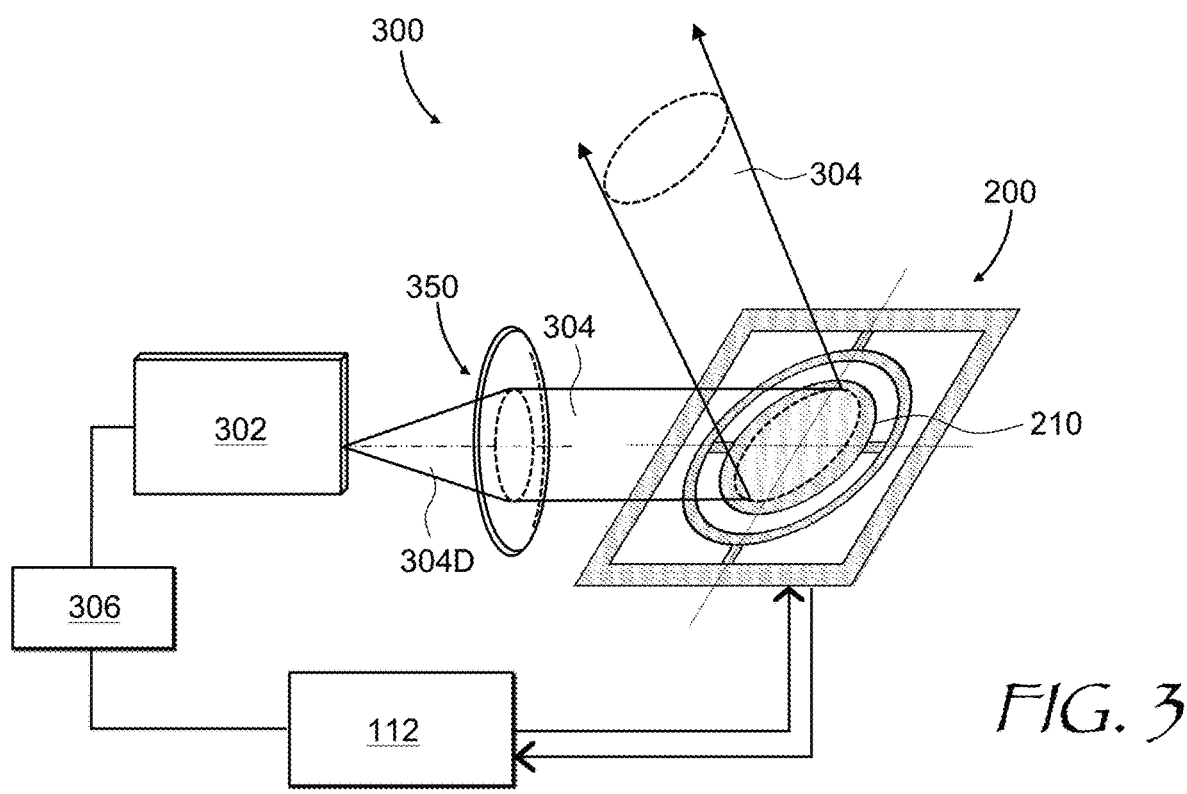
FIG. 3 is a schematic view of a scanning image projector of the near-eye display of FIG. 1, the scanning image projector using the 2D tiltable MEMS reflector of FIG. 2.

Turning to FIG. 3, a scanning projector 300 includes a light engine 302 coupled to a beam scanner, such as the 2D MEMS scanner 200 of FIG. 2. The light engine 302 may include a single emitter or an array of emitters for providing a diverging light beam 304D of different brightness, color composition, etc. An optional collimator 350 is optically coupled to the light engine 302, to collimate the diverging light beam 304D and provide a collimated light beam 304, which is optically coupled to the 2D MEMS scanner 200 described above with reference to FIG. 2. The collimator 350 (FIG. 3) may be e.g. a lens or any other optical component having optical power, i.e. focusing or collimating power, such as a concave mirror, a diffractive lens, a folded-beam freeform optical element, etc. The reflector 210 of the 2D MEMS scanner 200 is optically coupled to the collimator 350 for receiving and angularly scanning the collimated light beam 304 to form the image in angular domain.

The controller 112 may be operably coupled to an electronic driver 306, which is coupled to the light engine 302. The controller 112 may be coupled to the 2D MEMS scanner 200 for controllable tilting the reflector 210 of the 2D MEMS scanner 200. The electronic driver 306 may configured to provide powering electric signals to energize different emitters of the light engine 302.

In operation, the controller 112 sends commands to the electronic driver 306 to energize the light engine 302 in coordination with tilting the 2D MEMS scanner 200, for providing, or "painting", an image in angular domain. When viewed by a human eye, the image in angular domain is projected by the eye's cornea and lens to become a spatial-domain image on the eye's retina, as explained above with reference to FIG. 1. In some embodiments, the 2D MEMS scanner 200 may be replaced with a pair of 1D tiltable mirrors, one for scanning about X axis, and the other for scanning about Y axis. The two 1D tiltable mirrors may be optically coupled e.g. via a pupil relay. Other types of scanners may be used. The light engine 302 may include single-mode or multimode emitters, for example and without limitation side-emitting laser diodes, vertical-cavity surface-emitting laser diodes, superluminescent light-emitting diodes, light-emitting diodes, etc.

Figure 4:
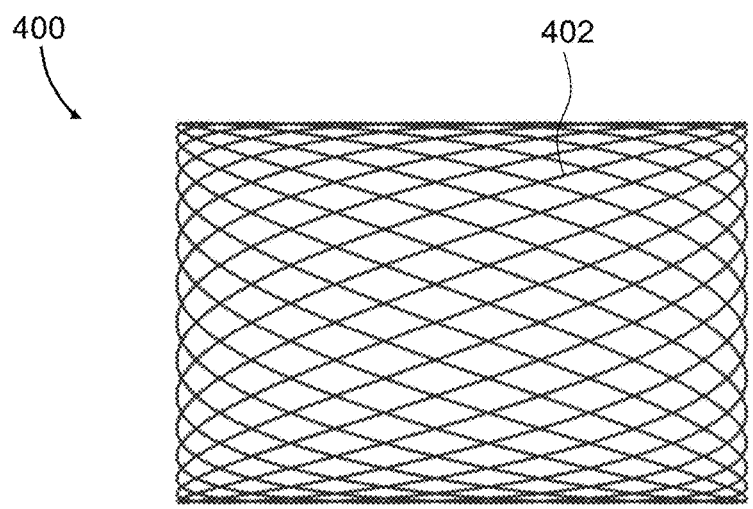
FIG. 4 is a trace diagram of a biresonant Lissajous scanning by the scanning projector display of FIG. 3.

Referring now to FIG. 4, a trace diagram 400 shows a nonlinear trajectory 402 of the collimated light beam 304 in X- and Y-angles defined by the MEMS scanner 200 of the scanning projector 300 of FIG. 3. In this example, the MEMS scanner 200 operates in a biresonant mode, i.e. the X- and Y-oscillations of the tiltable reflector 210 are at or near corresponding mechanical oscillation resonances. At or near resonances, mechanical oscillations are approximately sinusoidal. Since the X- and Y-oscillations of the reflector 210 are approximately sinusoidal, the trajectory 402 (FIG. 4) is generally a complex Lissajous figure, or a combination of Lissajous figures that, after a sufficient number of oscillation periods, will cover the entire field of view of the image provided by the scanning projector 300. When the Lissajous scanning is performed faster than a time response of a human eye, the eye will see a steady image.

The inventors have discovered that, when the order of "painting" of individual image pixels in the trace diagram 400 is pseudo-random, interlaced, and/or changes direction of painting the pixels of neighboring portions of the image being displayed, the eye and/or displayed object movement may result in image distortions, banding, or a complete image breakdown. In other words, the benefit of reduced power consumption due to (bi)resonant scanning of a tiltable reflector may come at a cost of introducing image motion artifacts.

FIGS. 5A to 5E show examples of such artifacts, in a graphic form. FIGS. 5A to 5E depict side-by-side space-time graphs illustrating the location, within an FOV, of a displayed object at different moments of time. The location is measured in degrees. The time in milliseconds is plotted along a downward-directed vertical axis, and the location in degrees is plotted along the horizontal axis. The image on the top left indicates the motion scenario. The table on the right defines the movement of the content (i.e. the object being displayed), the user's head, and the user's eyes. The plots on the bottom right illustrate the space-time diagram of a biresonant closed-loop Lissajous scanning. The plots on the bottom left correspond to the space-time diagram of a raster-type scanning where image is displayed line by line, each line being straight or linear. Herein, the term "linear" refers to the shape of the scanning trajectory. When the scanning trajectory may be approximated by a straight line, or is nominally straight, the scanning is termed "linear". Accordingly, when the scanning trajectory is not straight by design (i.e. before aberrations, distortions, etc.) the scanning is termed nonlinear. In going from FIG. 5A to FIG. 5E, the image scanning interval (the image displaying period corresponding to a frame rate) and all scanning rates are the same for ease of comparison.

Figure 5A:
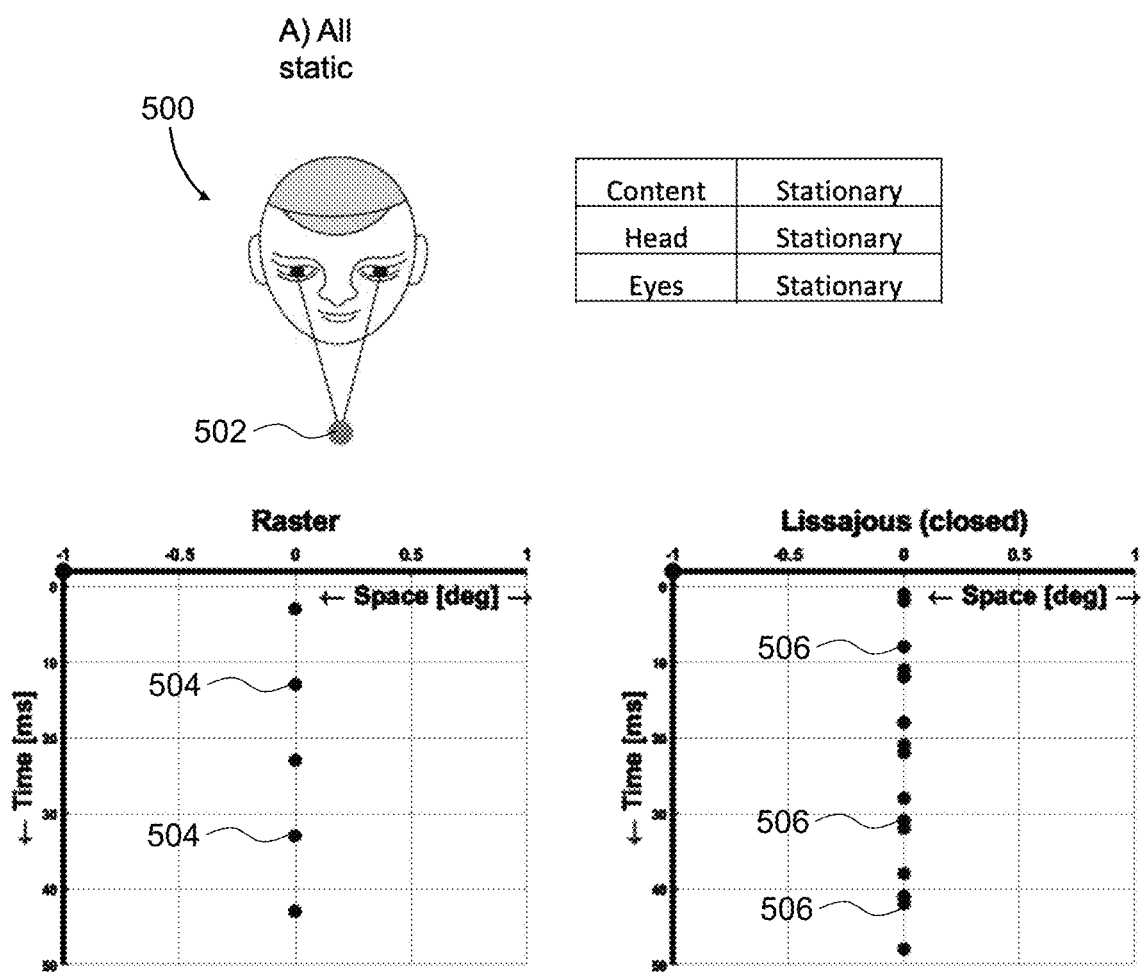
FIGS. 5A to 5E are side-to-side space-time graphs illustrating visual motion artifacts for linear raster-type scanning projectors and nonlinear Lissajous scanning projectors in different motion scenarios.

Referring specifically to FIG. 5A, a viewer 500 views a small displayed object 502. In this initial example, the viewer's head and eyes are stationary, and so is the object 502. The linear raster scanning of a steadily viewed steady object may be represented by a set of vertically equidistant linear scanning dots 504 (FIG. 5A, bottom left). The biresonant Lissajous scanning is represented by a set of Lissajous scanning dots 506 (FIG. 5A, bottom right). The Lissajous scanning dots 506 are not equidistantly spaced along vertical axis because the intersection of Lissajous figures with the axis corresponding to location of 0 degrees, i.e. at the FOV center, occurs in uneven moments of time, due to the nonlinear, interlacing nature of the Lissajous scanning trajectory.

Figure 5B:
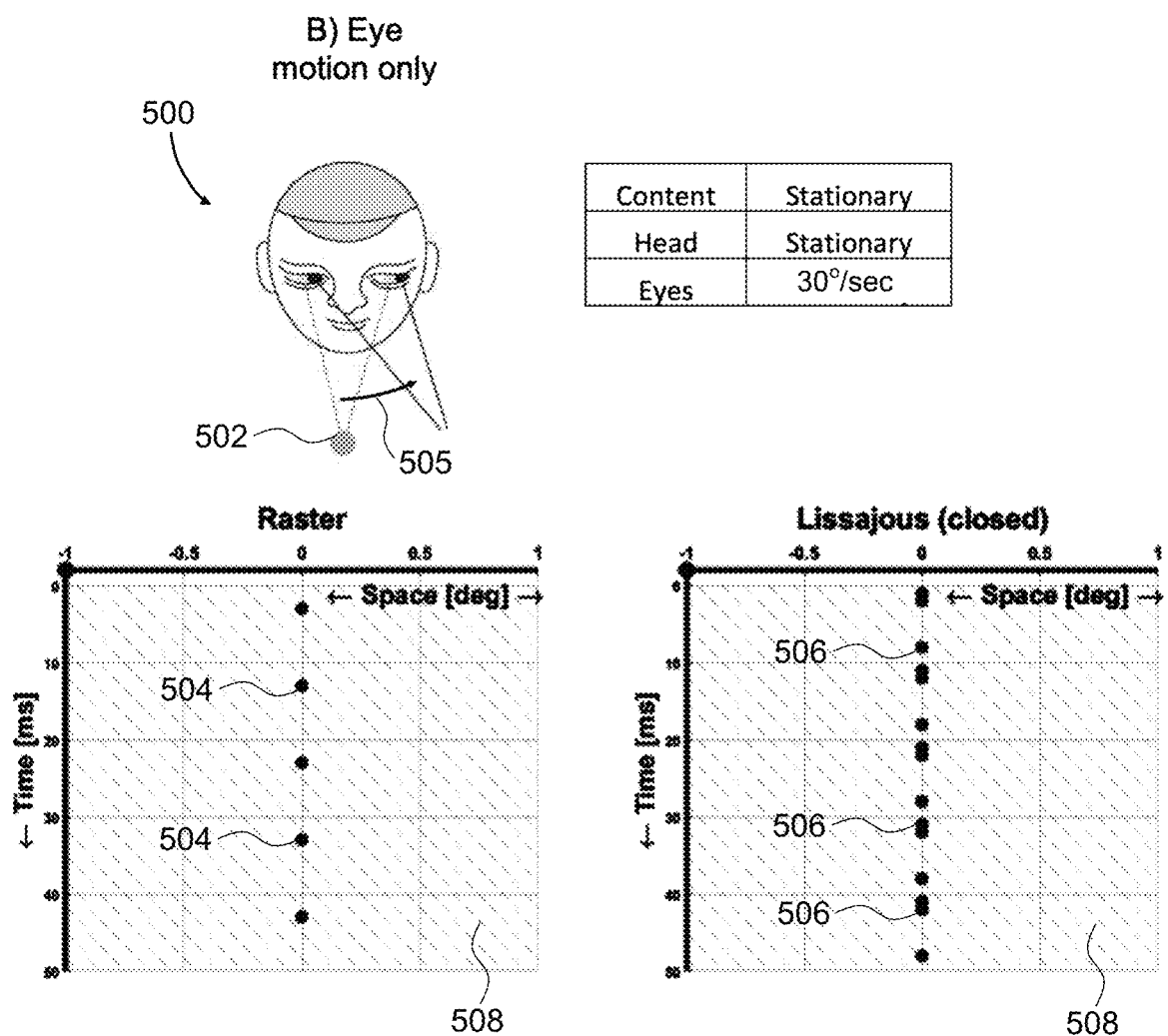

Referring to FIG. 5B, the viewer 500 views the object 502. In this example, the viewer's head and the object 502 are stationary, but the eyes are moving at 30 degrees per second in a direction illustrated with a curved arrow 505. The eyes movement does not cause a significant shift of location of the object 502 in both space-time graphs of FIG. 5B, as illustrated by the linear scanning dots 504 and the Lissajous scanning dots 506. Dashed lines 508 represent how the eye retina translates through this space-time diagram. From the frame of reference of the retina, the raster scanner leaves a trail of images of object 502. These phantom array images are all locally complete and consistent. From the frame of reference of the retina, the Lissajous scanner leaves a trail of broken, partial images of object 502 which are banded, structured, and irregular.

Figure 5C:
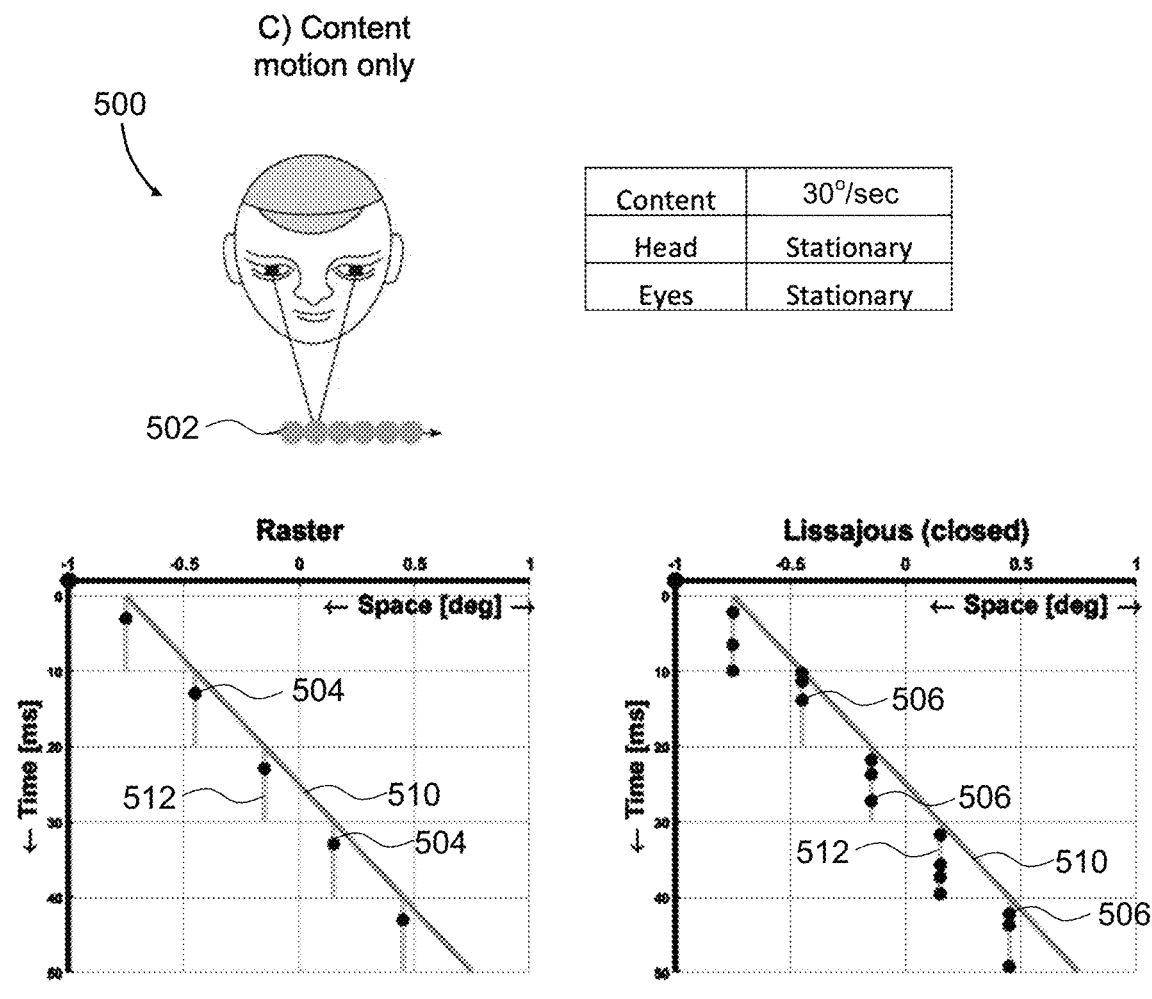

Turning to FIG. 5C, the viewer 500 views the object 502. In this example, the viewer's head and eyes are stationary while the object 502 is moving at 30 degrees per second. The true, intended position of the object, or implied trajectory, is represented by the diagonal line 510. The movement of the object 502 causes the linear scanning dots 504 to be uniformly shifted down from an implied trajectory 510, depending on the time offset between the beginning of the frame and when the raster scan reaches the object 502. The amount of the shift depends on the ratio of the scanning speed to the movement speed, and is a constant fraction of an image scanning interval 512. The Lissajous scanning dots 506 also shift down, but at a variable fraction of the image scanning interval 512. This indicates that a Lissajous scanning may cause a moving object to visually break down, as compared to the appearance of the object when it is still.

Figure 5D:
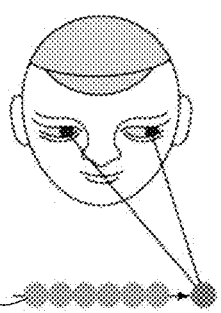
Figure 5D:
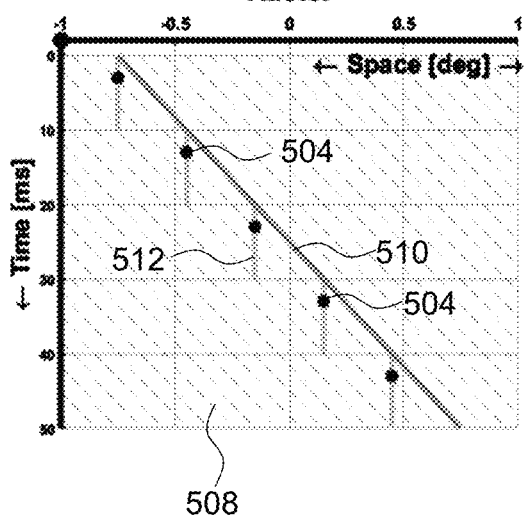
Figure 5D:
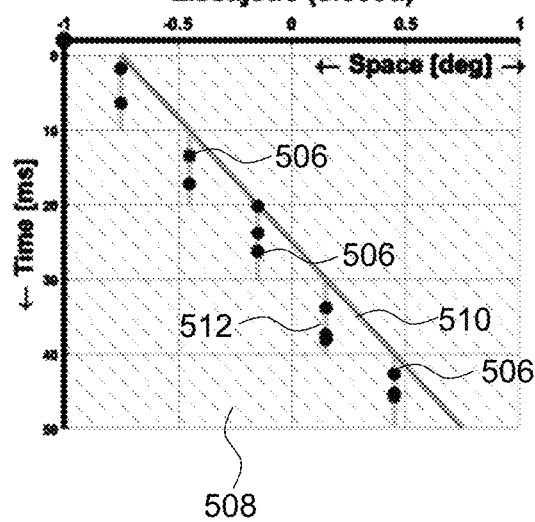

FIG. 5D illustrates a "smooth pursuit" case where the viewer's head is stationary, the object 502 is moving at 30 degrees per second, the viewer's eyes following the object 502 at the same speed of 30 degrees per second. Like in the previous case, the movement of the object causes the linear scanning dots 504 to be uniformly shifted down from an implied trajectory 510. The amount of the shift depends on the ratio of the scanning speed to the movement speed, and is a constant fraction of an image scanning interval 512. The Lissajous scanning dots also shift down, but at a variable fraction of the image scanning interval 512. The eye movement may cause the background of the object 502 and the object itself to appear banded, structured, and broken. The reference frame of the retina is depicted by the dashed diagonal lines 508 in both graphs.

Figure 5E:
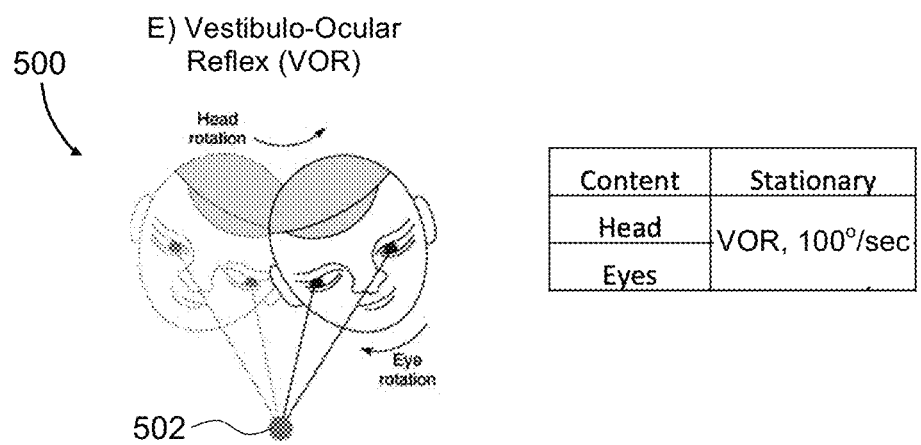
Figure 5E:
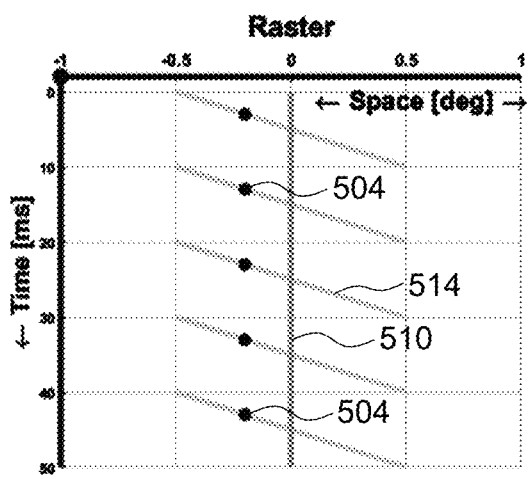
Figure 5E:
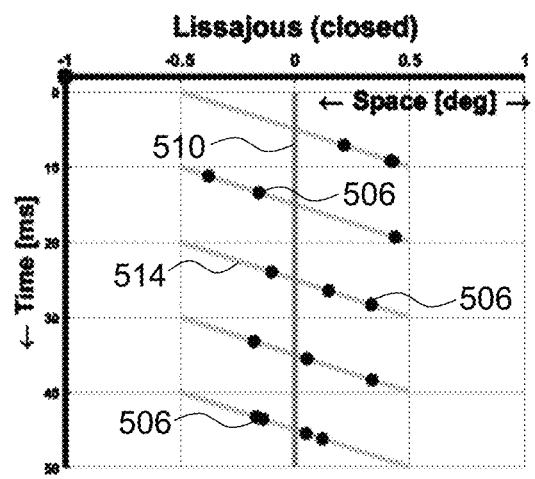

Finally in FIG. 5E, the viewer 500 views the object 502. FIG. 5E illustrates a case where the object 502 remains stationary, the head is rotating while the eyes quickly move (at 100 degrees per second) to stay on the object due to vestibulo-ocular reflex (VOR). The quick eye movement causes the linear scanning dots to shift along skewed lines 514 representing the image scanning interval by a same amount. However, the Lissajous scanning dots 506 spread significantly, indicating the possibility of a complete image breakdown during VOR eye movements in displays with Lissajous scanning.

Figure 6A:
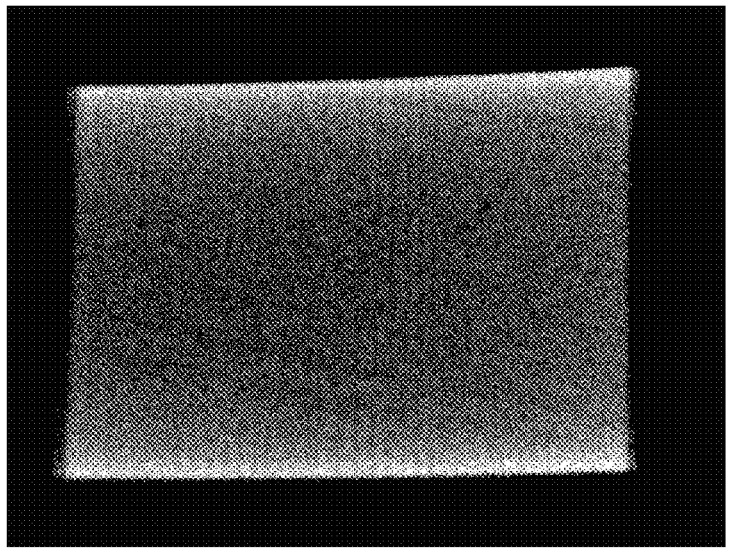
FIG. 6A is a steady view of a flat field of a Lissajous scanning projector.
Figure 6B:
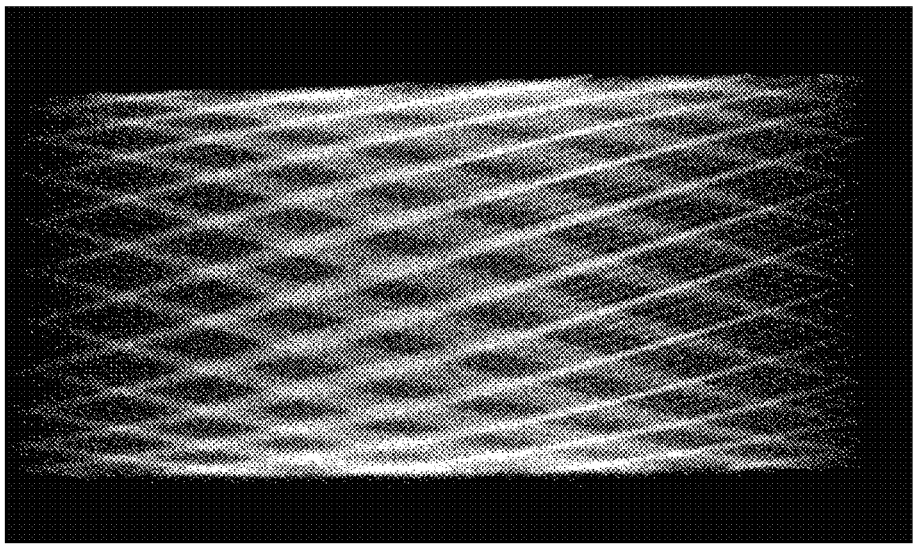
FIG. 6B is a saccade transitional view of the flat field of the Lissajous scanning projector.

Image artifacts may also appear when a continuous background is displayed. Referring for example to FIG. 6A, a Lissajous scanning projector, e.g. the scanning projector 300 of FIG. 3 in a biresonant scanning mode, displays a flat field, i.e. a uniformly illuminated FOV portion. Although scanning artifacts can be vaguely seen, the illuminating remains uniform. When, however, the viewer's eyes undergo a saccadic movement, i.e. a rapid shift from one viewing direction to another, the flat field may break down into a succession of bright interlaced lines. This is illustrated in FIG. 6B, showing a plurality of intersecting straight white lines forming a rhombic net or grid. Such a dependence of the displayed imagery on the eye movement may be distracting and even annoying to a viewer.

Figure 7A:
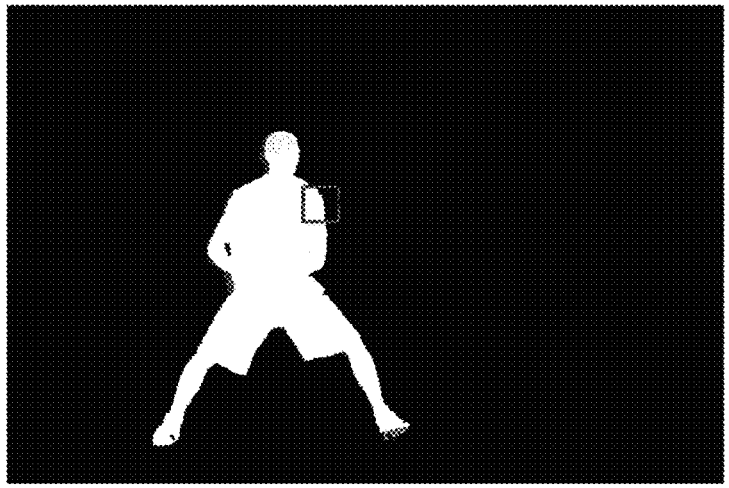
FIGS. 7A and 7C are views of an image generated by a scanning projector with linear raster-type scanning and nonlinear Lissajous scanning, respectively.
Figure 7B:
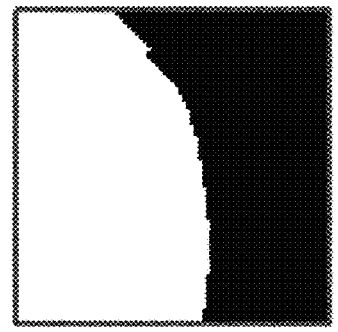
FIGS. 7B and 7D are magnified partial views of FIGS. 7A and 7C respectively.
Figure 7C:
Figure 7D:
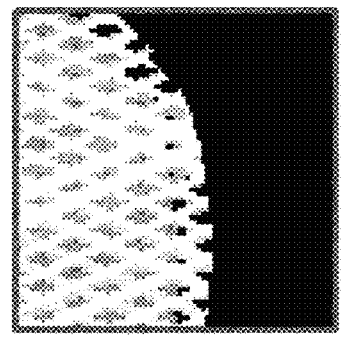

Lissajous scanning artifacts may also reveal themselves in texturing and edge distortion of displayed objects. Referring to FIG. 7A, a silhouette of a basketball player is displayed by a linear raster-type scanning projector display. It is seen that at linear raster scanning, the texture remains uniform and the edges remain sharp, as better seen on the insert image of FIG. 7B. Nonlinear Lissajous type scanning however may cause textures to appear. For example, the basketball player silhouette shown in FIG. 7C appears slightly textured, and the edges begin to break down, as better seen in the insert image of FIG. 7D.

In accordance with the present disclosure, the non-linear scanning, such as a biresonant Lissajous scanning, may be performed in a manner that greatly reduces the motion-caused and stationary image artifacts. To that end, limitations on the scanning timing, directionality, and the character of scanning may be imposed. When these limitations are implemented, and the scanning is performed within parameter ranges and in certain directions as disclosed herein, much cleaner and more steady images may be obtained. Such a nonlinearly scanned image may approximate, in its cleanliness and absence of artifacts, a linear raster-type scanning, while keeping the energy-saving advantages of biresonant scanning of a tiltable reflector as noted above.

Figure 8A:
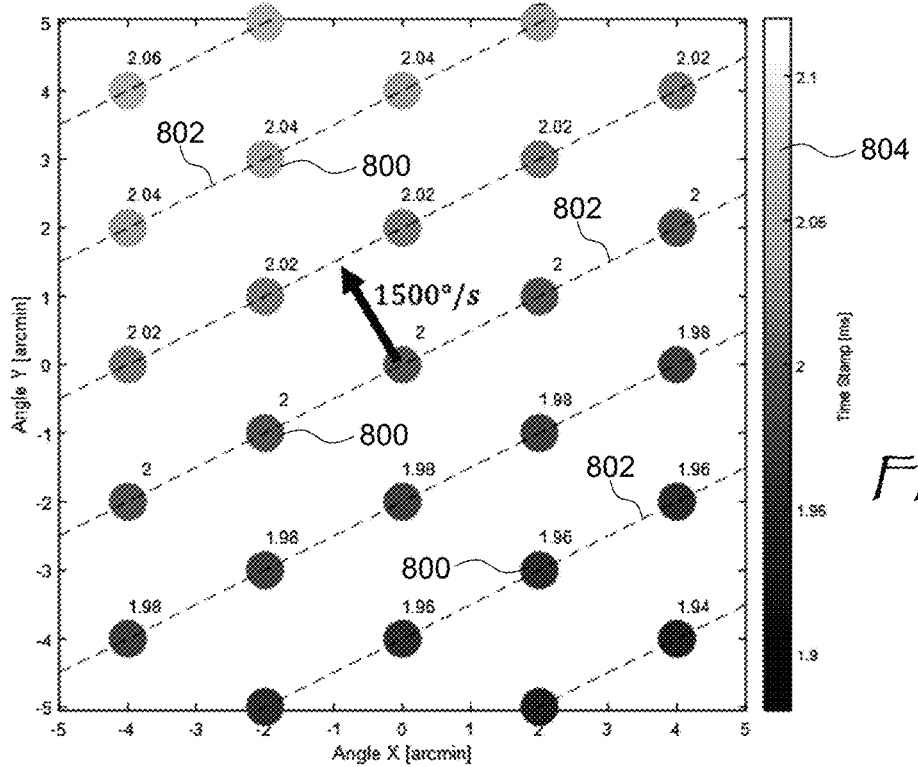
FIGS. 8A and 8B are timestamp maps of non-interlaced and interlaced Lissajous scanning, respectively.

To reduce, suppress, and/or eliminate the undesired image artifacts illustrated above with reference to FIGS. 5A-5E, 6A-6B and 7A-7D, the scanning may be performed at a high local rate, termed herein local image painting rate or image providing rate. The local image painting rate is defined as an angular distance between neighboring image portions or lines divided by a time interval between providing or painting these image portions or lines during the scanning process, in a direction perpendicular to the lines. Referring for example to FIG. 8A, pixels 800 of the displayed image, shown with circles of varying darkness, are painted by scanning an image light beam along scanning lines 802 shown with dashed lines running parallel to one another. The timestamp (in milliseconds) of painting or providing each pixel 800 are shown to the top right of the corresponding circle, and in addition is illustrated with the degree of shade of each circle. The later painted pixels and lines correspond to the lighter shade of the circles, as indicated with a scale shade bar 804 to the right of the image.

While the neighboring pixels 800 on the same scanning line 802 are painted almost instantaneously due to a high rate of nonlinear scanning, the neighboring pixels 800 of a different scanning line 802 are painted with a small delay required for the scanned image light beam to finish the previous scanning line 802. At a small delay, e.g. when the image across at least 75% of an area of the FOV is provided at the local rate of image painting of greater than 1500 degrees per second, the image scanning artifacts may be considerably reduced, or even completely eliminated. Herein, the term "local" refers to pixels on neighboring lines of the displayed image. Such scanning is termed herein "coherent" or "consecutive" scanning. The consecutive nonlinear scanning enables one to reduce motion-caused image artifacts despite the non-linear or resonant character of the scanning, i.e. despite the scanning being absent a raster-type linear or a triangular scanning. At the same time, the resonant Lissajous scanning is considerably more energy-efficient than the raster-type linear or a triangular scanning. Therefore, an overall improvement of the display performance is achieved.

In FIG. 8A, consecutive scans provide conterminous portions of the image. In other words, the consecutive scans provide neighboring scanning lines 802, i.e. there is no interlacing present in FIG. 8A, making the "timestamp map" of FIG. 8A very uniform and free of sharp gradients or jumps. To further reduce distortions, consecutive Lissajous scanning may be performed in a same direction. When consecutive Lissajous scans paint conterminous portions of the image, the image artifacts caused by object or eye motion are reduced, and when conterminous image portions are painted in a same direction, the image artifacts are reduced even further. It is also important to keep the local painting rate variation small, e.g. the local angular rate of painting may vary by no more than 10% across at least 75% of 3 degrees by 3 degrees portions of the FOV. Keeping the rate of painting high also facilitates the overall reduction of motion artifacts.

Figure 8B:
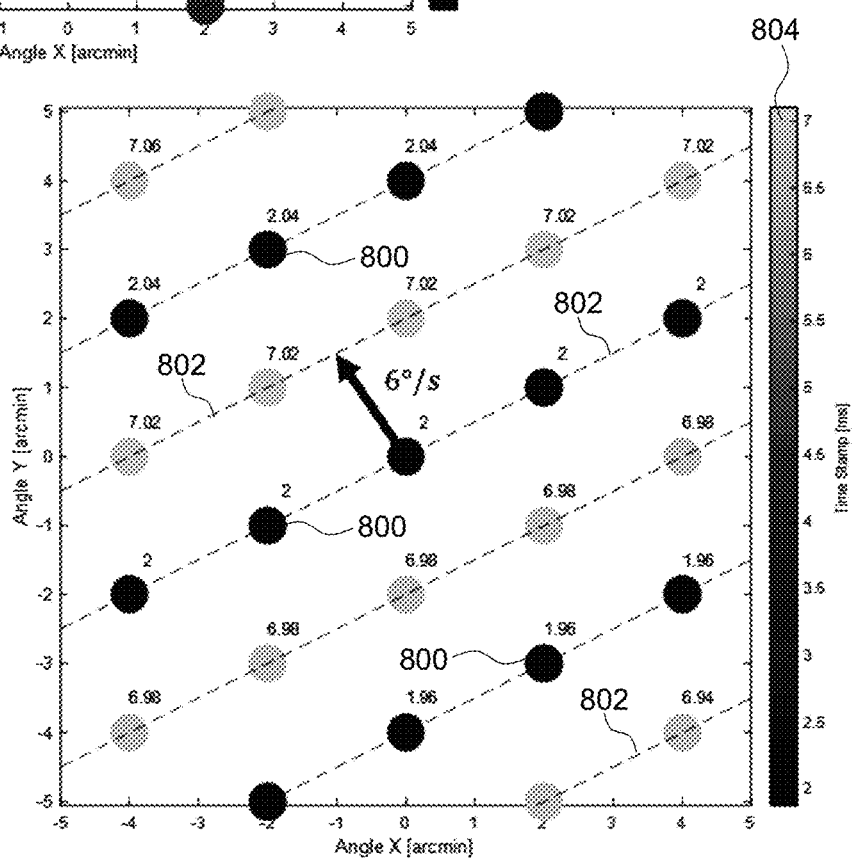

FIG. 8B illustrates interlaced Lissajous scanning for comparison with the "coherent" scanning depicted in FIG. 8A. In FIG. 8B, neighboring scanning lines 802 are not painted consecutively, which considerably slows down the local image painting rate, from 1500 degrees per second illustrated in FIG. 8A to only 6 degrees per second illustrated in FIG. 8B. At such a low local image painting rate, many of the above described image artifacts may appear in the images being viewed.

Figure 9A:
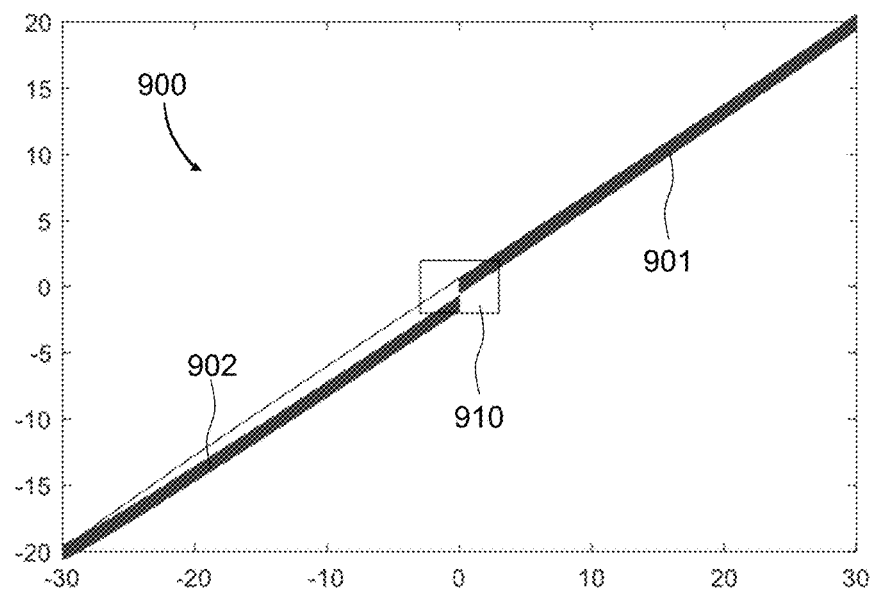
FIG. 9A is a view of two consecutive scans by a biresonant tiltable reflector at approximately 1:1 $F_Y$:$F_X$ resonant frequency ratio.

Referring now to FIG. 9A with further reference to FIG. 3, a Lissajous trajectory 900 (FIG. 9A) of the collimated light beam 304 (FIG. 3) corresponds to a case when scanning frequencies about the X and Y axes are approximately (but not exactly) equal. The Lissajous trajectory 900 includes a first portion 901 and a second, consecutive portion 902 painted immediately (i.e. without interlacing) after the first portion 901. At a first time interval, the light engine 302 is energized to provide the collimated light beam 304 that "paints" or provides a first portion of the image along the first portion 901 of the Lissajous trajectory 900. At a second time interval later than the first time interval, the light engine 302 is energized to provide the collimated light beam 304 providing a second, consecutive or conterminous portion of the image along the second portion 902 of the Lissajous trajectory 900. In FIG. 9A, the first 901 and second 902 trajectory portions are shown meeting up at a location 910 to illustrate that the conterminous portions of the image are "painted" during consecutive scans; it is to be understood that the first 901 and second 902 trajectory portions are disposed next to one another, i.e. share a common border. The second trajectory portion 902 is not extended further in FIG. 9A for clarity of the picture. In the interval of time following the interval illustrated, the trajectory portion 902 will proceed alongside the previously painted trajectory portion 901.

Figure 9B:
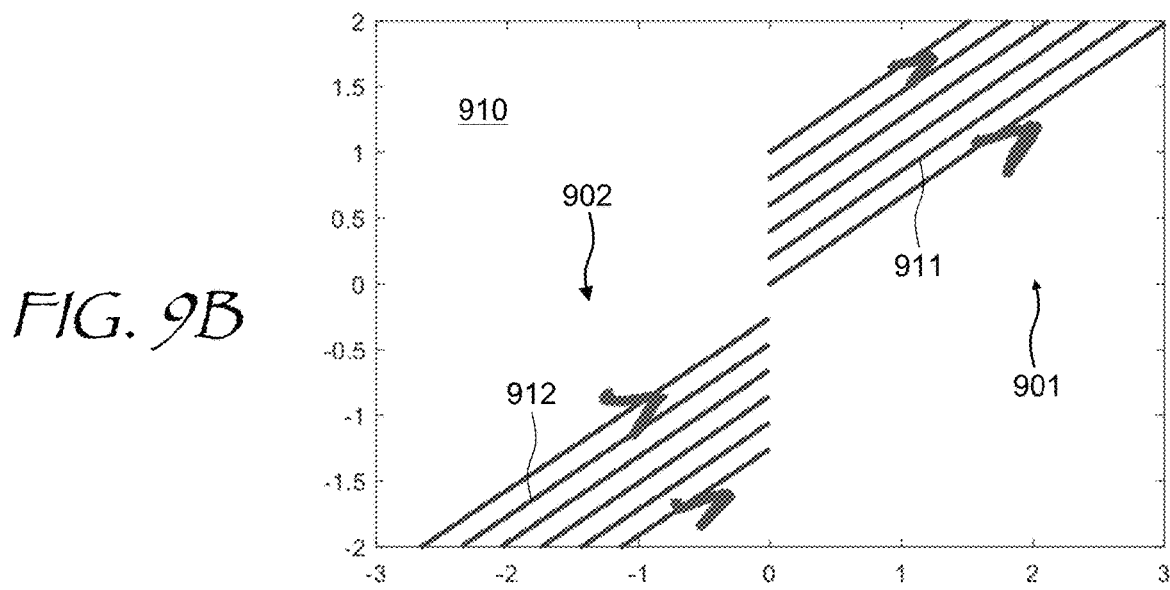
FIG. 9B is a magnified view of FIG. 9A.

In embodiments where the light engine 302 includes a multi-emitter light source, the first 901 and second 902 trajectory portions may be used to paint, i.e. provide or energize, several image pixels at a time. This is illustrated in FIG. 9B, which may be viewed as a magnified location 910 in FIG. 9A. The first trajectory portion 901 uses six emitters to provide six conterminous sub-beams or sub-portions that paint lines 911 of the image pixels. The next six lines 912 are painted alongside the initial six lines 911. The next six lines 912 form the second trajectory portion 902. The controller 112 (FIGS. 1 and 3) may be configured to vary a brightness of each sub-portions in coordination with the scanning to provide consecutive sub-portions of the consecutive portions of the image provided by the consecutive scans. The scanning frequencies about the X and Y axes may be not exactly 1:1 to make sure that the second trajectory portion 902 does not repeat the first trajectory portion 901 but is rather disposed next to the first trajectory portion 901, and is conterminous with it.

Figure 10A:
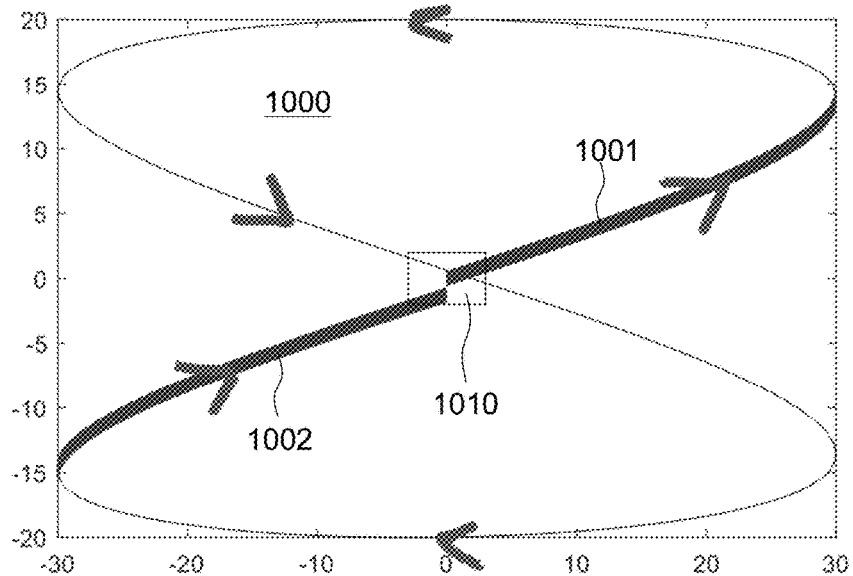
FIG. 10A is a view of two consecutive scans by a biresonant tiltable reflector at approximately 2:1 $F_Y$:$F_X$ resonant frequency ratio.

FIG. 10A illustrates a case where the scanning frequency about Y axis is about twice the scanning frequency about X axis. A Lissajous trajectory 1000 includes a first portion 1001 and a second, conterminous portion 1002. At a first time interval, the light engine 302 is energized to provide the collimated light beam 304 that "paints" or provides the first portion of the image along the first portion 1001 of the Lissajous trajectory 1000. At a second time interval later than the first time interval, the light engine 302 is energized to provide the collimated light beam 304 providing the second, conterminous portion 1002 of the image along the Lissajous trajectory 1000. In FIG. 10A, the first 1001 and second 1002 trajectory portions are shown meeting up at a location 1010, to illustrate that the conterminous portions of the image are "painted" during consecutive scans; it is to be understood that the first 1001 and second 1002 trajectory portions are disposed next to one another, and are conterminous i.e. share a common border.

Figure 10B:
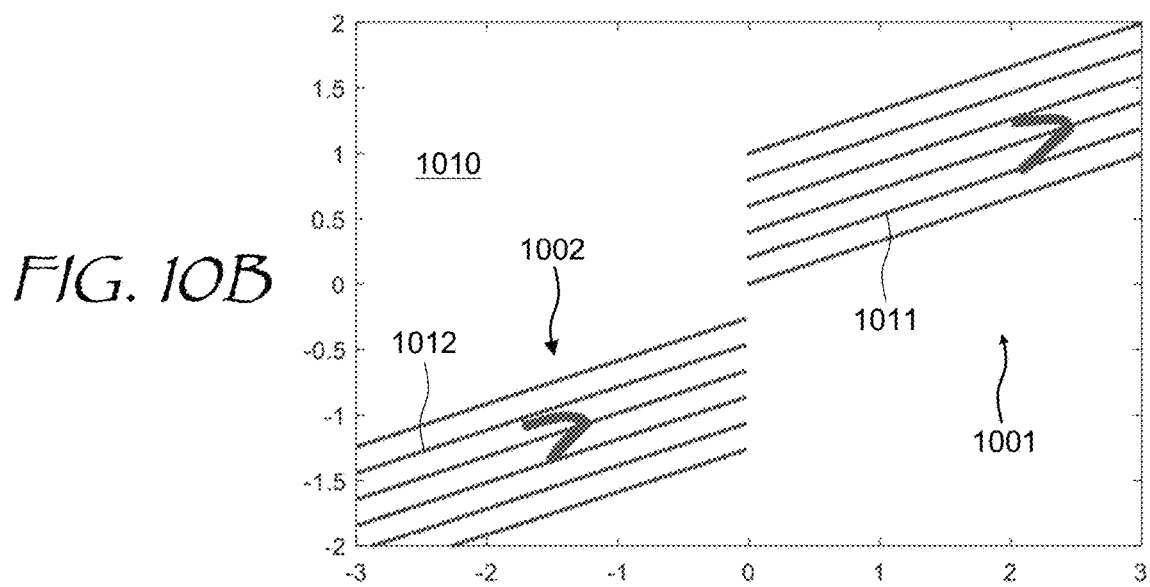
FIG. 10B is a magnified view of FIG. 10A.

FIG. 10B illustrates the multi-emitter embodiment of the light engine 302. The first trajectory portion 1001 uses six emitters to provide six conterminous sub-beams or sub-portions that paint lines 1011 of the image pixels. The next six lines 1012 are painted alongside the initial six lines 1011. The next six lines 1012 form the second trajectory portion 1002. The controller 112 (FIGS. 1 and 3) is configured to vary a brightness of each sub-beam in coordination with the scanning to provide consecutive sub-portions of the consecutive portions of the image provided by the consecutive scans.

A similar scanning configuration may be provided for the ratio of resonant frequencies of scanning about the first and second axes of three, four, and so on. From a practical standpoint, the ratio of resonant frequencies of scanning about the first and second axes may be equal to 1, 2, 3, etc. to within 0.05. For biresonant beam scanner embodiments with substantially sinusoidal scanning of the light beam about the first and second axes (before distortions and aberrations in the image forming train) at corresponding resonant frequencies of the beam scanner, each subsequent scan about the second axis may be performed at a shift about the first axis substantially equal to the array width measured in a direction of the array, i.e. perpendicular to the lines 911, 912 of FIG. 9B and the lines 1011, 1012 of FIG. 10B.

Figure 11:
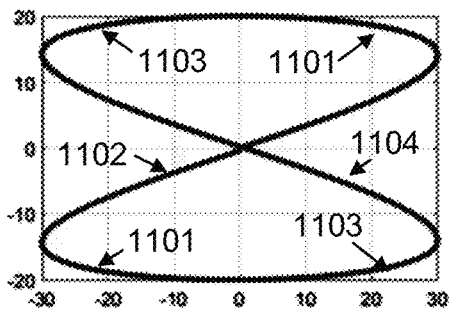
FIGS. 11(A) to (H) are views of a nearly 2:1 Lissajous scanning trace at different phases of the Lissajous figure, illustrating unidirectional Lissajous scanning by four portions of the Lissajous scanning trace.
Figure 11:
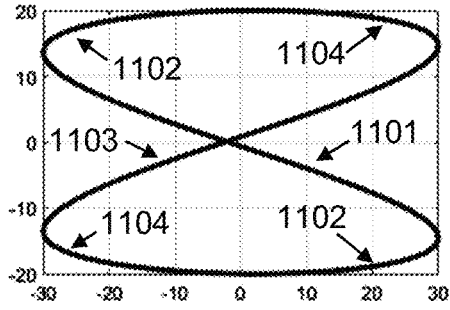
Figure 11:
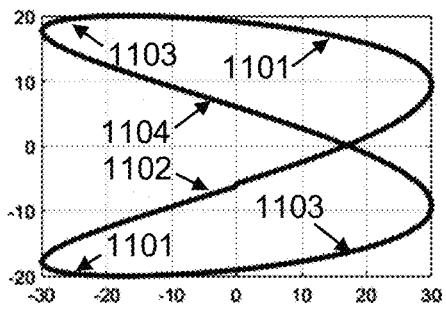
Figure 11:
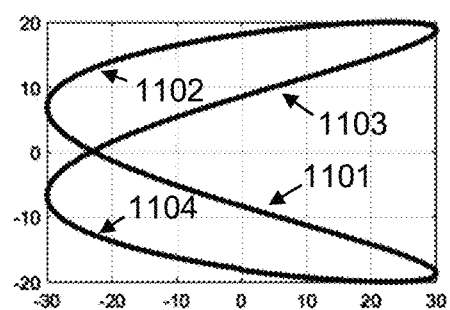
Figure 11:
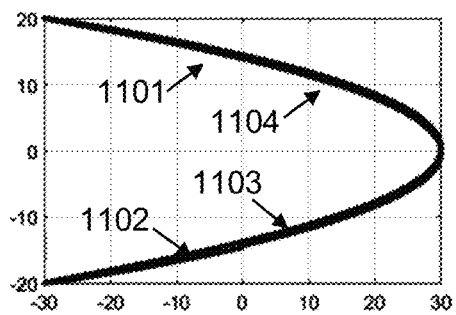
Figure 11:
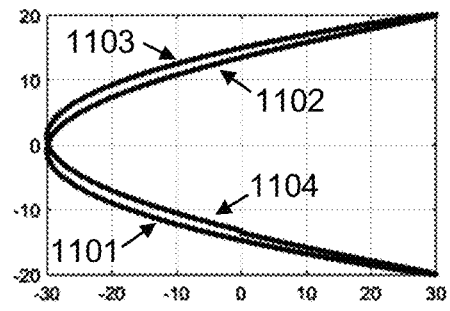
Figure 11:
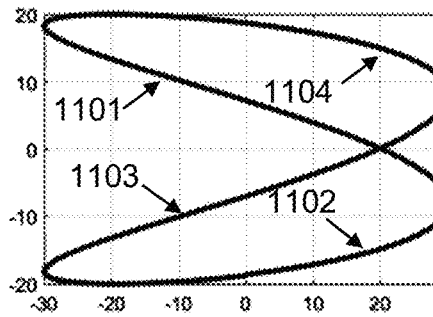
Figure 11:
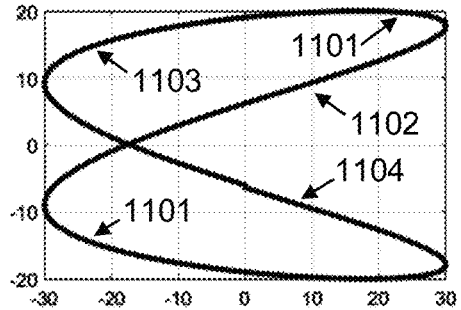

The unidirectional Lissajous scanning may further reduce the motion-caused image artifacts. An embodiment of 2:1 biresonant Lissajous scanning is illustrated in FIGS. 11(A) through (H). In FIGS. 11(A)-(H), the entire "FIG. 8" shaped Lissajous scanning trajectory is broken in four portions: a first portion 1101, a second portion 1102, a third portion 1103, and a fourth portion 1104. Each portion 1101, 1102, 1103, and 1104 may be used to provide or "paint" the entire FOV unidirectionally. For example, the first portion 1101 includes a top-right and left-bottom corner of "FIG. 8" of FIG. 11(A). Proceeding to FIG. 11(B), the top-right portion of the first portion 1101 grows, and the bottom-left portion shrinks. In FIG. 11(C), the first portion 1101 extends from top left to middle right, and in FIGS. 11(D) and (E) the first portion 1101 becomes a single curve extending diagonally from top left to bottom right and progressing in downward direction in going from FIG. 11(C) to FIG. 11(D) to FIG. 11(E) and further to FIG. 11(F). In FIG. 11(G), the first portion 1101 extends from mid-left to bottom right, breaking down again into two portions in FIG. 11(H). The process then repeats at FIG. 11(A).

The second portion 1102 begins in FIG. 11(A) extending from top right to bottom left. The second portion 1102 moves down in FIG. 11(B), extending from middle right to bottom left in FIG. 11(C), and shifting further down in FIG. 11(D). In FIG. 11(E), the second portion 1102 the top left corner, extending from middle left to top right in FIG. 11(G) and shifting further down in FIG. 11(H).

The third portion 1103 behaves oppositely to the first portion 1101, consisting of top left and bottom right components in FIGS. 11(A) and 11(B), and transforming into a single component shifting upward in going through FIGS. 11(C), (D), (E), and (F), extending from middle left to top right in FIG. 11(G) and shifting upwards in FIG. 11(H).

The fourth portion 1104 behaves oppositely to the second portion 1102, extending from top left to bottom right in FIG. 11(A), shifting upwards in going through FIGS. 11(B)-(D), breaking down into two components or sub-portions in FIG. 11(E), the bottom left component growing in FIG. 11(F) and shifting upwards in going through FIGS. (G) and (H).

Any of the first 1101 to fourth 1104 portions may be used to unidirectionally scan high "coherence" and high local painting rate. The controller 112 of FIGS. 1 and 3 may be configured to provide the image during consecutive scans about the first axis in a same direction, and additionally to provide the image during consecutive scans about the second axis in a same direction. Furthermore in some embodiments, the first 1101 to fourth 1104 portions may be used together e.g. to increase spatial resolution in selected areas of the FOV. Selection of such areas may be dynamic e.g. it may be coordinated with the eye gaze direction of the user determined by an eye tracking system.

To perform steady consecutive image painting with suppressed artifacts due to motion of eye or displayed objects, the X- and Y-oscillations of the reflector 210 of the scanning projector 300 of FIG. 3 may be synchronized or phase-locked to one another. The X- and Y-oscillations of the reflector 210 may be generally characterized by the tilt angles $\theta_x$ and $\theta_y$, which are defined as $$\theta_x = A_x \sin(2\pi F_x t + \varphi_x)$$

$$\theta_y = A_y \sin(2\pi F_y t + \varphi_y) \qquad (1)$$

where $A_x$ and $A_y$ are X- and Y-oscillation amplitudes respectively, $F_x$ and $F_y$ are frequencies of oscillation about X- and Y-axis respectively, and $\varphi_x$ and $\varphi_y$ are phases of oscillation about X- and Y-axis respectively. The X- and Y-oscillations may be phase locked such that a frequency $F_1$ of scanning about the first axis and a frequency $F_2$ of scanning about the second axis may satisfy the condition $$F_1 = N_1 * R, F_2 = N_2 * R, \qquad (2)$$

wherein $N_1$ and $N_2$ are coprime numbers, and R a repetition rate (frame rate).

The conditions of "coherent" or consecutive nonlinear image painting along conterminous image painting paths, with low motion-caused artifacts, may be met when a local angular rate of providing consecutive portions of the image is above a threshold value over the majority of the solid angle of the field of view. When the image painting is interlaced, the local rate of painting will vary or jump. At interlaced scanning, some consecutive portions of the image will be painted nearly consecutively, while some consecutive portions of the image may be painted with a delay caused by the light beam painting different (remote) areas of the image. To provide "coherent" painting resilient to motion-caused artifacts, non-linearly scanning a light beam about first and second axes may be performed such that consecutive Lissajous scans provide conterminous portions of the image in angular domain. In some embodiments, the local angular rate of illuminating consecutive portions of the image is greater than 1500 degrees per second over at least 75% of the field of view. A unidirectional scanning, e.g. the one presented in FIGS. 9A, 9B and FIGS. 10A, 10B, further facilitates the suppression of eye movement artifacts.

During normal operation, the eye may move relative to the display. Examples of relative motion include saccades, smooth pursuit, and the vestibular ocular reflex (VOR). In the reference frame of the retina, a conventional, low-coherence Lissajous trajectory paints an image by dense interlacing throughout the frame time. By way of a non-limiting illustrative example, a Lissajous trajectory on a closed path may repeat every 10 ms at 100 Hz repetition rate. Adjacent "brush strokes" may be 6 arcmin wide and separated by 2 ms. These spatially consecutive, but not closely temporally consecutive, strokes advance at only 50 degrees per second. Such velocity is routinely reached during normal eye motion. Thus, if the eye moves in certain directions, the consecutive strokes will overlap on the retina in bright and dark bands instead of forming a coherent image. Depending on the painting configuration and direction of eye motion, these artifacts may appear locally as bright crosshatches or diagonal bands. In a coherent painting configuration, these artifacts are suppressed by avoiding multi-pass interlacing and maintaining a high image painting velocity, which locally advances in a direction orthogonal to the current Lissajous trajectory.

As explained above, the X- and Y-oscillations of the reflector 210 of the scanning projector 300 of FIG. 3 may be synchronized or phase-locked to one another for consecutive nonlinear image painting with high local angular rate of providing conterminous lines of the image. To avoid interlacing, the emitter spacing in the multi-emitter scanning configurations, e.g. those depicted in FIGS. 9B and 10B, needs to be quite small. The small emitter spacing needs to correspond to angular spacing of neighboring pixels in the FOV, i.e. correspond to the target angular resolution of the scanning projector 300 of FIG. 3. For example, in a scanning display with 2 arcmin resolution, the emitters need to be spaced (in angular domain) by 2 arcmin. So, the angular width of a fan of sub-beams, each sub-beam corresponding to an emitter, may be the number of emitters multiplied by the angular emitter spacing.

Figure 12:
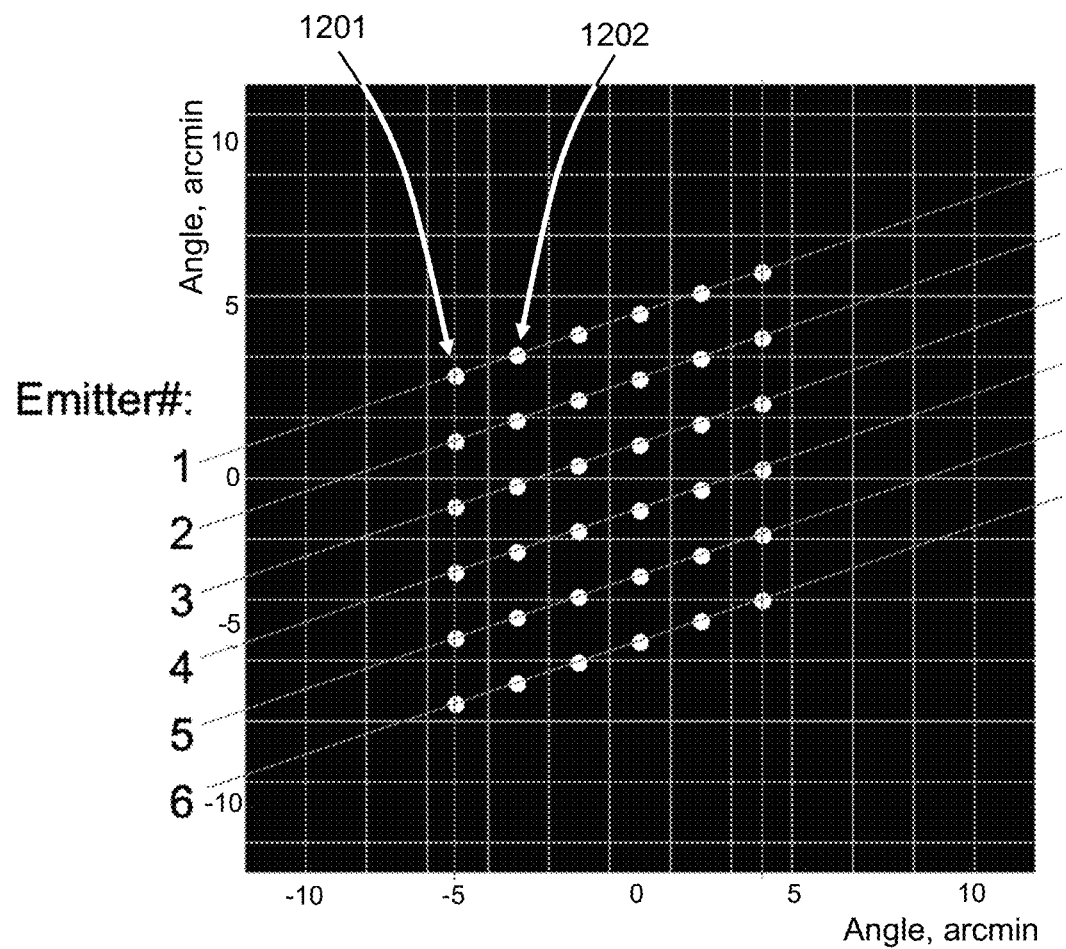
FIG. 12 is a scanning map for a multi-emitter light source with the light pulses generation synchronized to the scanning reflector.

Referring for a non-limiting illustrative example to FIG. 12, six emitters 1, 2, 3, 4, 5, and 6 provide or "paint" pixels 1201 at a first moment of time, pixels 1202 at a second moment of time, and so on. It may be advantageous to synchronize the firing of light pulses by the light engine 302 with the scanning cycle of the MEMS scanner 200 about one or both axes, to make sure that the displayed pixels stay at a predictable grid of locations across the FOV. For example, the sync may be configured such that a ratio of frequency P of providing a pixel of the image to a frequency $F_1$ of scanning about the first axis or a frequency $F_2$ of scanning about the second axis may be a rational number.

Figure 13:
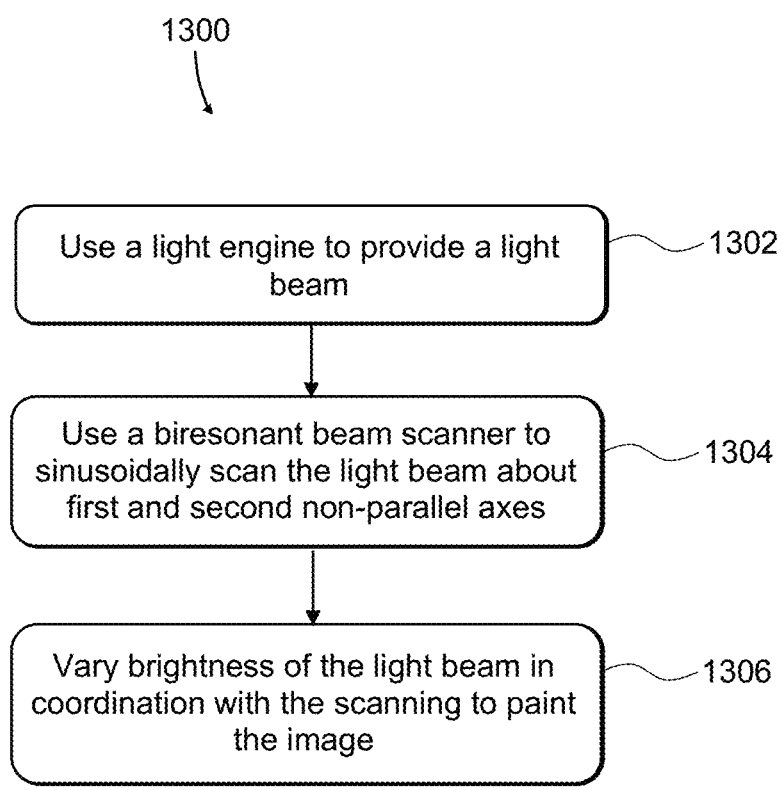
FIG. 13 is a flow chart of a method for providing an image in angular domain.

Turning to FIG. 13 with further reference to FIG. 3, a method 1300 for providing an image in angular domain includes using a light engine, e.g. the light engine 302, to provide (1302) a light beam e.g. the diverging light beam 304D. A biresonant beam scanner, e.g. the MEMS scanner 200, is used to sinusoidally scan (1304) the light beam about first and second non-parallel axes without interlacing, as explained above with reference to FIGS. 8A-B, 9A-B, 10A-B, FIGS. 11 and 12, for example. Brightness of the light beam is varied (1306) in coordination with the scanning to provide or "paint" the image in angular domain. The rate of providing the image across at least 75% of an area of the field of view may be greater than 1500 degrees per second. Consecutive sinusoidal scans of the light beam about the first and/or second axis may be performed in a same direction using one of four portions of the Lissajous figure, e.g. as explained above with reference to FIG. 11.

Figure 14:
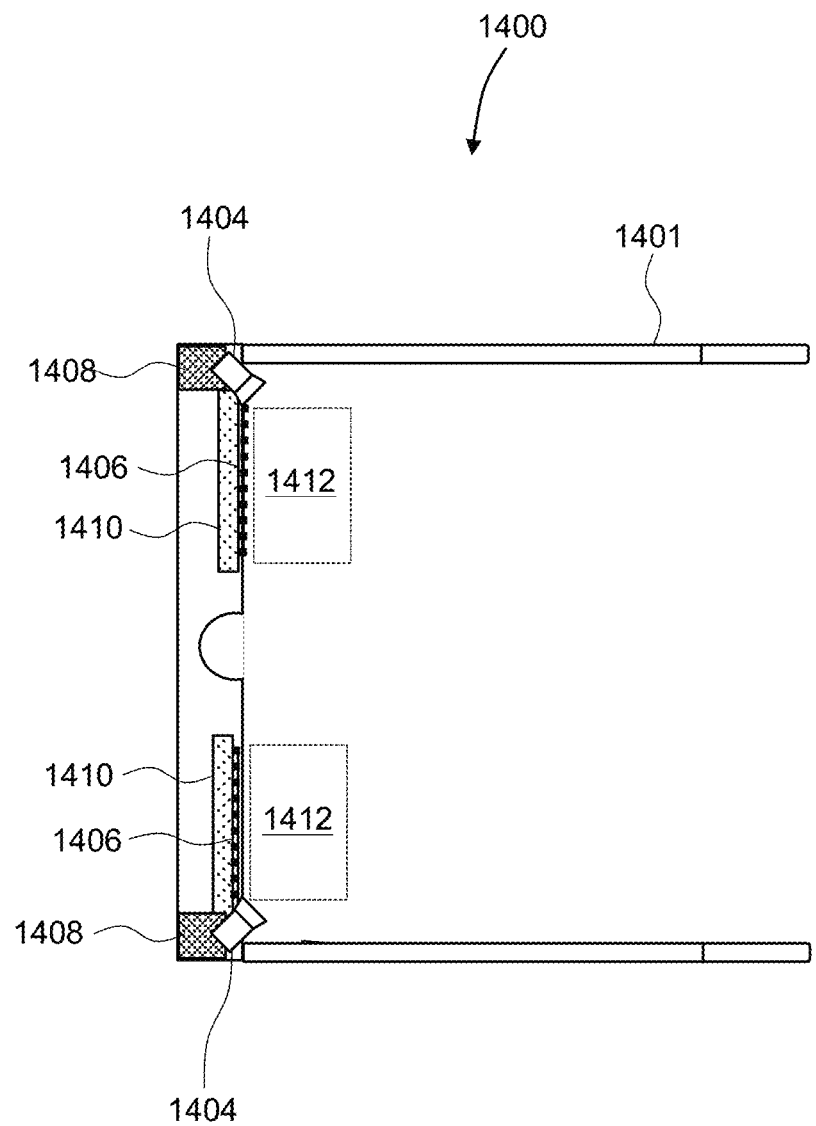
FIG. 14 is a view of an augmented reality (AR) display of this disclosure having a form factor of a pair of eyeglasses.

Referring to FIG. 14, an augmented reality (AR) near-eye display 1400 includes a frame 1401 having a form factor of a pair of eyeglasses. The frame 1401 supports, for each eye: a scanning projector 1408 such as the scanning projector 300 of FIG. 3 or any other scanning projector variant considered herein, a pupil-replicating waveguide 1410 optically coupled to the projector 1408, an eye-tracking camera 1404, and a plurality of illuminators 1406. The illuminators 1406 may be supported by the pupil-replicating waveguide 1410 for illuminating an eyebox 1412. The projector 1408 provides a fan of light beams carrying an image in angular domain to be projected into a user's eye. The pupil-replicating waveguide 1410 receives the fan of light beams and provides multiple laterally offset parallel copies of each beam of the fan of light beams, thereby extending the projected image over the eyebox 1412. The coherence length of the laser sight source of the projector 1408 may be less than a difference between optical path lengths of multiple light paths inside the pupil-replicating waveguide 1410. This enables one to lessen or reduce optical interference at the eyebox 1412 between portions of the image light propagated via different light paths.

Multi-emitter laser sources may be used in the projector 1408. Each emitter of the multi-emitter laser chip may be configured to emit image light at an emission wavelength of a same color channel. The emission wavelengths of different emitters of the same multi-emitter laser chip may occupy a spectral band having the spectral width of the laser source.

In some embodiments, the projector 1408 may include two or more multi-emitter laser chips emitting light at wavelengths of a same color channel or different color channels. For AR applications, the pupil-replicating waveguide 1410 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1404 is to determine position and/or orientation of both eyes of the user. Once the position and orientation of the user's eyes are known, a gaze convergence distance and direction may be determined. The imagery displayed by the projectors 1408 may be adjusted dynamically to account for the user's gaze, for a better fidelity of immersion of the user into the displayed augmented reality scenery, and/or to provide specific functions of interaction with the augmented reality. In operation, the illuminators 1406 illuminate the eyes at the corresponding eyeboxes 1412, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1412.

In some embodiments, the image processing and eye position/orientation determination functions may be performed by a central controller, not shown, of the AR near-eye display 1400. The central controller may also provide control signals to the projectors 1408 to generate the images to be displayed to the user, depending on the determined eye positions, eye orientations, gaze directions, eyes vergence, etc.

Figure 15:
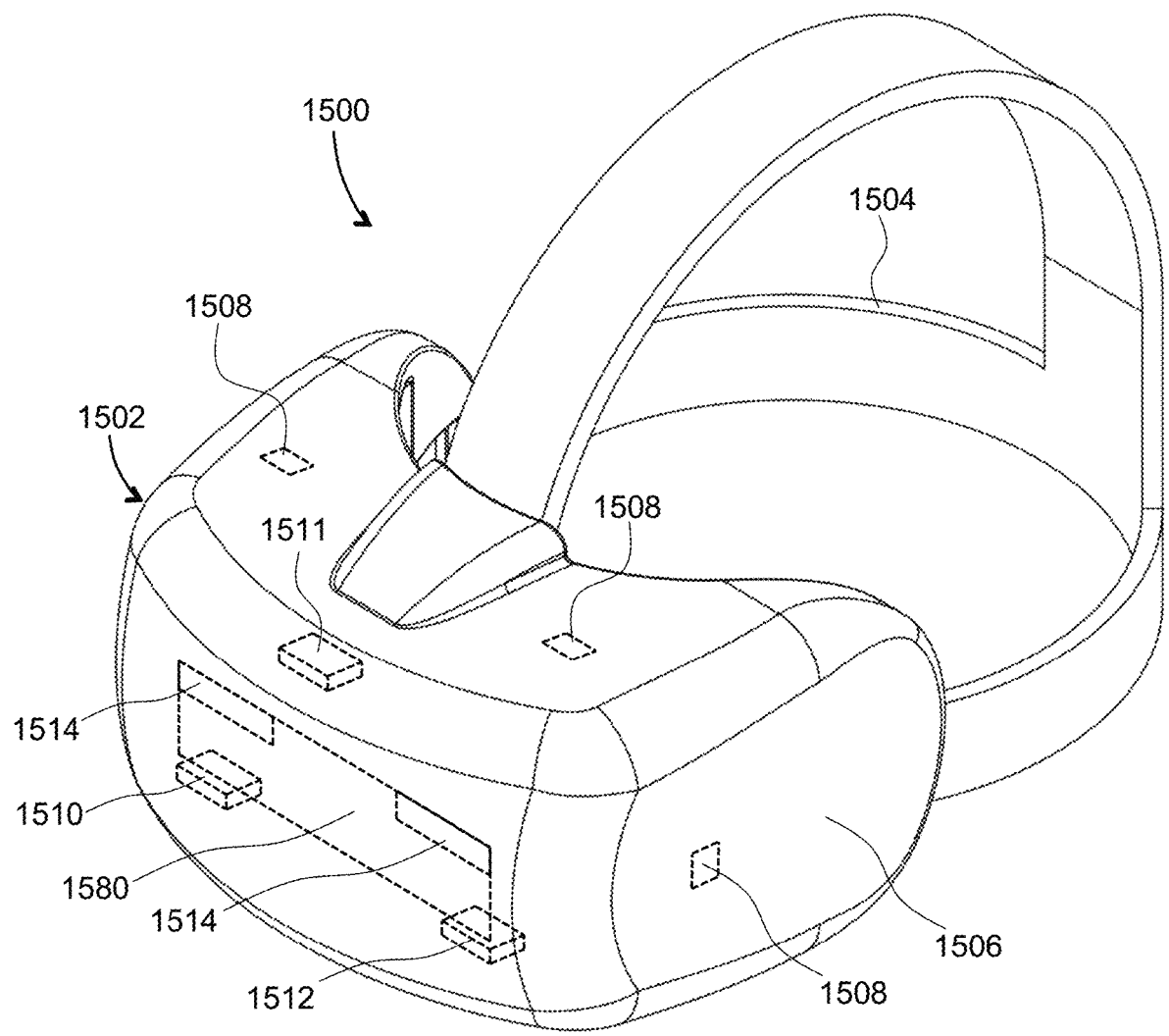
FIG. 15 is a 3D view of a head-mounted display (HMD) of this disclosure.

Turning to FIG. 15, an HMD 1500 is an example of an AR/VR wearable display system. The function of the HMD 1500 is to augment views of a physical, real-world environment with computer-generated imagery, and/or to generate the entirely virtual 3D imagery. The HMD 1500 may include a front body 1502 and a band 1504. The front body 1502 is configured for placement in front of eyes of a user in a reliable and comfortable manner, and the band 1504 may be stretched to secure the front body 1502 on the user's head. A display system 1580 may be disposed in the front body 1502 for presenting AR/VR imagery to the user. The display system 1580 may include any of the image projectors considered herein. Sides 1506 of the front body 1502 may be opaque or transparent.

In some embodiments, the front body 1502 includes locators 1508 and an inertial measurement unit (IMU) 1510 for tracking acceleration of the HMD 1500, and position sensors 1512 for tracking position of the HMD 1500. The IMU 1510 is an electronic device that generates data indicating a position of the HMD 1500 based on measurement signals received from one or more of position sensors 1512, which generate one or more measurement signals in response to motion of the HMD 1500. Examples of position sensors 1512 include: one or more accelerometers, one or more gyroscopes, one or more magnetometers, another suitable type of sensor that detects motion, a type of sensor used for error correction of the IMU 1510, or some combination thereof. The position sensors 1512 may be located external to the IMU 1510, internal to the IMU 1510, or some combination thereof.

The locators 1508 are traced by an external imaging device of a virtual reality system, such that the virtual reality system can track the location and orientation of the entire HMD 1500. Information generated by the IMU 1510 and the position sensors 1512 may be compared with the position and orientation obtained by tracking the locators 1508, for improved tracking accuracy of position and orientation of the HMD 1500. Accurate position and orientation is important for presenting appropriate virtual scenery to the user as the latter moves and turns in 3D space.

The HMD 1500 may further include a depth camera assembly (DCA) 1511, which captures data describing depth information of a local area surrounding some or all of the HMD 1500. To that end, the DCA 1511 may include a laser radar (LIDAR), or a similar device. The depth information may be compared with the information from the IMU 1510, for better accuracy of determination of position and orientation of the HMD 1500 in 3D space.

The HMD 1500 may further include an eye tracking system 1514 for determining orientation and position of user's eyes in real time. The obtained position and orientation of the eyes also allows the HMD 1500 to determine the gaze direction of the user and to adjust the image generated by the display system 1580 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1502.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A scanning projector for providing an image having a field of view, the scanning projector comprising:
   a light engine for providing a light beam;
   a beam scanner coupled to the light engine for scanning the light beam about first and second non-parallel axes; and
   a controller operably coupled to the light engine and the beam scanner and configured to cause the beam scanner to non-linearly scan the light beam about the first and second axes within the field of view while varying brightness of the light beam to provide the image;
   wherein consecutive scans provide conterminous portions of the image, and wherein a local rate of providing the image across at least 75% of an area of the field of view is greater than 1500 degrees per second.

2. The scanning projector of claim 1, wherein the scanning is absent a raster-type scanning comprising a linear scanning or a triangular scanning.

3. The scanning projector of claim 1, wherein in operation, the image is provided at a repetition rate R, wherein a frequency $F_1$ of scanning about the first axis and a frequency $F_2$ of scanning about the second axis satisfy the condition $F_1=N_1*R$, $F_2=N_2*R$, wherein $N_1$ and $N_2$ are coprime numbers.

4. The scanning projector of claim 1, wherein a ratio of frequency P of providing a pixel of the image to a frequency $F_1$ of scanning about the first axis or a frequency $F_2$ of scanning about the second axis is a rational number.

5. The scanning projector of claim 1, wherein the beam scanner is a biresonant beam scanner with substantially sinusoidal scanning of the light beam about the first and second axes at corresponding resonant frequencies of the beam scanner.

6. The scanning projector of claim 5, wherein a ratio of the resonant frequencies of scanning about the first and second axes is equal to 1, 2, or 3 to within 0.05.

7. The scanning projector of claim 1, wherein the controller is configured to provide the image during consecutive scans about the first axis in a same direction.

8. The scanning projector of claim 7, wherein the controller is configured to provide the image during consecutive scans about the second axis in a same direction.

9. The scanning projector of claim 1, wherein the light beam provided by the light engine comprises an array of sub-beams, wherein the controller is configured to vary a brightness of each sub-beam in coordination with the scanning to provide conterminous sub-portions of the conterminous portions of the image provided by the consecutive scans.

10. The scanning projector of claim 9, wherein:
the beam scanner is a biresonant beam scanner with substantially sinusoidal scanning of the light beam about the first and second axes at corresponding resonant frequencies of the beam scanner;
the array of sub-beams has an array width in a direction of the array; and
each subsequent scan about the second axis is performed at a shift about the first axis substantially equal to the array width.

11. A scanning projector for providing an image having a field of view, the scanning projector comprising:
a light engine for providing a light beam;
a beam scanner coupled to the light engine for scanning the light beam about first and second non-parallel axes; and
a controller operably coupled to the light engine and the beam scanner and
configured to:
cause the beam scanner to non-linearly scan the light beam about the first and second axes within the field of view; and
cause the light engine to provide the light beam having brightness varying in coordination with scanning by the beam scanner, thereby providing the image,
wherein a local angular rate of providing conterminous lines of the image varies by less than 90% across at least 75% of the field of view.

12. The scanning projector of claim 11, wherein the local angular rate varies by no more than 10% across at least 75% of 3 degrees by 3 degrees portions of the field of view.

13. The scanning projector of claim 11, wherein the scanning is absent a raster-type scanning comprising a linear scanning or a triangular scanning.

14. The scanning projector of claim 11, wherein in operation, the image is provided at a repetition rate R, wherein a frequency $F_1$ of scanning about the first axis and a frequency $F_2$ of scanning about the second axis satisfy the condition $F_1=N_1*R$, $F_2=N_2*R$, wherein $N_1$ and $N_2$ are coprime numbers.

15. The scanning projector of claim 11, wherein the beam scanner is a biresonant beam scanner with substantially sinusoidal scanning of the light beam about the first and second axes at corresponding resonant frequencies of the beam scanner.

16. The scanning projector of claim 15, wherein:
a ratio of the resonant frequencies of scanning about the first and second axes are equal to 1, 2, or 3 to within 0.05; and
the controller is configured to provide the image during consecutive scans about the first axis in a same direction.

17. A method for providing an image in angular domain, the method comprising:
using a light engine to provide a light beam; and
using a biresonant beam scanner to sinusoidally scan the light beam about first and second non-parallel axes without interlacing, while varying brightness of the light beam in coordination with the scanning,
wherein a local rate of providing the image across at least 75% of an area of the image is greater than 1500 degrees per second.

18. The method of claim 17, wherein consecutive sinusoidal scans of the light beam about the first axis are performed in a same direction.

* * * * *